US008862754B2

(12) United States Patent
McGowan

(10) Patent No.: US 8,862,754 B2
(45) Date of Patent: *Oct. 14, 2014

(54) GLOBAL ACCESS CONTROL FOR SEGMENTED STREAMING DELIVERY

(76) Inventor: Albert John McGowan, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/543,045

(22) Filed: Jul. 6, 2012

(65) Prior Publication Data

US 2013/0081110 A1    Mar. 28, 2013

Related U.S. Application Data

(63) Continuation of application No. 13/245,324, filed on Sep. 26, 2011, now Pat. No. 8,239,546.

(51) Int. Cl.
| | | |
|---|---|---|
| *G06F 15/16* | (2006.01) | |
| *H04L 29/06* | (2006.01) | |
| *H04L 29/08* | (2006.01) | |
| *H04L 9/08* | (2006.01) | |
| *H04L 9/00* | (2006.01) | |
| *H04L 9/32* | (2006.01) | |

(52) U.S. Cl.
CPC ...... *H04L 65/1069* (2013.01); *H04L 29/06176* (2013.01); *H04L 29/06* (2013.01); *H04L 29/06319* (2013.01); *H04L 29/06326* (2013.01); *H04L 29/08585* (2013.01); *H04L 29/08639* (2013.01); *H04L 65/1066* (2013.01); *H04L 67/14* (2013.01); *H04L 9/0813* (2013.01); *H04L 9/006* (2013.01); *H04L 9/0844* (2013.01); *H04L 9/32* (2013.01); *H04L 9/3213* (2013.01); *H04L 65/602* (2013.01)
USPC ............................. 709/229; 709/227; 709/228

(58) Field of Classification Search
CPC .............. H04L 29/06; H04L 29/06176; H04L 29/06319; H04L 29/06326; H04L 29/08585; H04L 29/08639; H04L 67/14; H04L 65/1066; H04L 9/006; H04L 9/0813; H04L 9/0844; H04L 9/32; H04L 9/3213
USPC ......... 709/227, 228, 229, 217, 218, 219, 231; 725/25, 87; 455/414.1; 713/170, 156; 380/281; 726/26
See application file for complete search history.

(56) References Cited

U.S. PATENT DOCUMENTS

| 5,612,742 A | 3/1997 | Krause et al. |
|---|---|---|
| 6,505,169 B1 | 1/2003 | Bhagavath et al. |

(Continued)

FOREIGN PATENT DOCUMENTS

| AU | 2010/202741 B1 | 12/2010 |
|---|---|---|
| CN | 101282478 A | 10/2008 |

(Continued)

OTHER PUBLICATIONS

Australian Patent Office, Examiner's First Report on Patent Application No. 2010202740 for Unicorn Media, Inc., dated Aug. 10, 2010, 3 pages.

(Continued)

*Primary Examiner* — Le H Luu
(74) *Attorney, Agent, or Firm* — Kilpatrick Townsend & Stockton LLP

(57) ABSTRACT

Various arrangements for controlling access to streaming media assets are presented. Transmission of segments of a media asset to a first user device may be commenced. During transmission of the media asset to the first user device, beaconing data from the first user device may be received and stored as session information. The first user device may no longer be permitted to receive the media asset at least partially due to the first user device no longer being authenticated. Transmission of a remainder of the plurality of media segments to the first user device may be ceased such that the first user device does not receive the media asset in its entirety.

14 Claims, 11 Drawing Sheets

(56) References Cited

U.S. PATENT DOCUMENTS

| | | | |
|---|---|---|---|
| 6,678,332 B1 | 1/2004 | Gardere et al. | |
| 6,792,047 B1 | 9/2004 | Bixby et al. | |
| 6,912,315 B1 | 6/2005 | Wong et al. | |
| 7,096,481 B1 | 8/2006 | Forecast et al. | |
| 7,116,894 B1 | 10/2006 | Chatterton | |
| 7,788,581 B1 | 8/2010 | Bauermeister | |
| 7,827,298 B2 | 11/2010 | Black et al. | |
| 7,877,511 B1 | 1/2011 | Berger et al. | |
| 7,925,549 B2 | 4/2011 | Looney et al. | |
| 7,925,849 B2 | 4/2011 | Izumi | |
| 7,958,007 B2 | 6/2011 | Urbanski et al. | |
| 7,992,165 B1 | 8/2011 | Ludewig et al. | |
| 8,027,787 B2 | 9/2011 | Odinak et al. | |
| 8,027,876 B2 | 9/2011 | Taylor | |
| 8,099,473 B2 | 1/2012 | Biderman et al. | |
| 8,145,782 B2 | 3/2012 | McGowan et al. | |
| 8,165,343 B1 | 4/2012 | McGowan | |
| 8,218,651 B1 | 7/2012 | Eshet et al. | |
| 8,239,546 B1 | 8/2012 | McGowan | |
| 8,301,733 B2 | 10/2012 | McGowan | |
| 2001/0029525 A1 | 10/2001 | Lahr | |
| 2002/0029282 A1 | 3/2002 | Buddhikot | |
| 2002/0046404 A1 | 4/2002 | Mizutani | |
| 2002/0073084 A1 | 6/2002 | Kauffman et al. | |
| 2002/0104096 A1 | 8/2002 | Cramer et al. | |
| 2002/0122430 A1 | 9/2002 | Haberman et al. | |
| 2002/0144262 A1 | 10/2002 | Plotnick et al. | |
| 2002/0150239 A1 | 10/2002 | Carny et al. | |
| 2003/0004804 A1 | 1/2003 | Landsman et al. | |
| 2003/0229900 A1* | 12/2003 | Reisman | 725/87 |
| 2004/0022391 A1* | 2/2004 | O'Brien | 380/281 |
| 2004/0268384 A1 | 12/2004 | Stone | |
| 2005/0076368 A1 | 4/2005 | Lee | |
| 2005/0163229 A1 | 7/2005 | Okada et al. | |
| 2005/0193205 A1 | 9/2005 | Jacobs et al. | |
| 2005/0207569 A1 | 9/2005 | Zhang et al. | |
| 2006/0015637 A1 | 1/2006 | Chung | |
| 2006/0114985 A1 | 6/2006 | Linzer | |
| 2006/0122882 A1 | 6/2006 | Brown et al. | |
| 2006/0129907 A1 | 6/2006 | Volk et al. | |
| 2006/0184410 A1 | 8/2006 | Ramamurthy et al. | |
| 2006/0288112 A1* | 12/2006 | Soelberg et al. | 709/231 |
| 2007/0053513 A1 | 3/2007 | Hoffberg | |
| 2007/0078712 A1 | 4/2007 | Ott IV et al. | |
| 2007/0162571 A1 | 7/2007 | Gupta et al. | |
| 2007/0168542 A1 | 7/2007 | Gupta et al. | |
| 2007/0198416 A1 | 8/2007 | Ye | |
| 2007/0233891 A1* | 10/2007 | Luby et al. | 709/231 |
| 2008/0005349 A1* | 1/2008 | Li et al. | 709/231 |
| 2008/0059310 A1 | 3/2008 | Lettow et al. | |
| 2008/0141027 A1* | 6/2008 | Kim et al. | 713/156 |
| 2008/0207182 A1 | 8/2008 | Maharajh et al. | |
| 2008/0215620 A1 | 9/2008 | Folgner et al. | |
| 2009/0003432 A1 | 1/2009 | Liu et al. | |
| 2009/0022172 A1 | 1/2009 | Haberman et al. | |
| 2009/0031424 A1* | 1/2009 | Ganesan et al. | 726/26 |
| 2009/0063280 A1 | 3/2009 | Wurster et al. | |
| 2009/0150941 A1 | 6/2009 | Riedl et al. | |
| 2009/0172197 A1 | 7/2009 | Kalaboukis et al. | |
| 2009/0217316 A1 | 8/2009 | Gupta | |
| 2009/0254572 A1 | 10/2009 | Redlich et al. | |
| 2009/0257435 A1 | 10/2009 | Karlsson et al. | |
| 2009/0287841 A1 | 11/2009 | Chapweske et al. | |
| 2009/0300145 A1 | 12/2009 | Musayev et al. | |
| 2009/0327896 A1 | 12/2009 | Pall et al. | |
| 2010/0057926 A1 | 3/2010 | Cao et al. | |
| 2010/0095121 A1* | 4/2010 | Shetty et al. | 713/170 |
| 2010/0100742 A1 | 4/2010 | Courington et al. | |
| 2010/0107200 A1 | 4/2010 | Drang et al. | |
| 2010/0118973 A1 | 5/2010 | Rodriguez et al. | |
| 2010/0129057 A1 | 5/2010 | Kulkarni | |
| 2010/0138892 A1 | 6/2010 | Meuninck et al. | |
| 2010/0161425 A1 | 6/2010 | Sideman | |
| 2010/0189131 A1 | 7/2010 | Branam et al. | |
| 2010/0205049 A1 | 8/2010 | Long et al. | |
| 2011/0029999 A1* | 2/2011 | Foti | 725/25 |
| 2011/0071911 A1 | 3/2011 | Tung et al. | |
| 2011/0161181 A1 | 6/2011 | Esteve Asensio et al. | |
| 2011/0238507 A1 | 9/2011 | Ben-Rubi | |
| 2011/0246603 A1 | 10/2011 | Lee | |
| 2011/0246659 A1 | 10/2011 | Bouazizi | |
| 2011/0264506 A1 | 10/2011 | Grant et al. | |
| 2011/0287748 A1* | 11/2011 | Angel et al. | 455/414.1 |
| 2012/0005312 A1 | 1/2012 | McGowan et al. | |
| 2012/0005313 A1 | 1/2012 | McGowan et al. | |
| 2012/0047542 A1 | 2/2012 | Lewis et al. | |
| 2012/0134355 A1 | 5/2012 | Vendrow et al. | |
| 2012/0167132 A1 | 6/2012 | Mathews et al. | |
| 2012/0179788 A1 | 7/2012 | McGowan | |
| 2012/0185530 A1 | 7/2012 | Reza | |
| 2012/0185608 A1 | 7/2012 | McGowan et al. | |
| 2012/0197419 A1 | 8/2012 | Dhruv et al. | |
| 2012/0198492 A1 | 8/2012 | Dhruv et al. | |

FOREIGN PATENT DOCUMENTS

| | | |
|---|---|---|
| GB | 2462732 B | 11/2010 |
| WO | 2010/025686 A1 | 3/2010 |
| WO | 2011/009205 A1 | 1/2011 |

OTHER PUBLICATIONS

Australian Patent Office, Examiner's First Report on Patent Application No. 2010202741 for Unicorn Media, Inc., dated Aug. 9, 2010. 4 pages.

Ben Atallah, S., et al., "Dynamic Configuration of Multimedia Applications," IFIP International Federation for Information Processing, 2003, 18 pages.

International Search Report and Written Opinion of PCT/US2012/071669 mailed on Apr. 5, 2013, 74 pages.

International Search Report and Written Opinion of PCT/US2012/071629 mailed on Apr. 5, 2013, 92 pages.

Prangl, M. et al. "Towards QoS Improvements of TCP-Based Media Delivery," Networking and Services, 2008, ICNS 2008: Fourth International Conference on IEEE, Piscataway, NJ, USA, Mar. 16, 2008, 6 pages.

* cited by examiner

GLOBAL ACCESS CONTROL FOR SEGMENTED STREAMING DELIVERY

CROSS-REFERENCES TO RELATED APPLICATIONS

This application is a continuation of patent application Ser. No. 13/245,324, filed on Sep. 26, 2011 in the United States, entitled "Global Access Control for Segmented Streaming Delivery." This application is related to patent application Ser. No. 12/976,890, filed Dec. 22, 2010 in the United States, entitled "Dynamic Indexing for Ad Insertion in Media Streaming." This application is also related to patent application Ser. No. 12/976,883, filed Dec. 22, 2010 in the United States, entitled "Dynamic Chunking for Media Streaming." Each of these applications is incorporated in its entirety for all purposes.

BACKGROUND

This disclosure relates in general to cloud-based computer processing and, but not by way of limitation, to controlling access to media assets (e.g., files) during streaming.

The delivery of media over networks, such as the Internet, can be accomplished in many ways, including progressive downloading or streaming. Streaming is often preferred to progressive downloading because it offers additional features such as content protection and the ability to seek to undownloaded parts of a media asset. The process of preparing a media asset for streaming typically involves "chunking" the asset, or dividing assets up into smaller segments for delivery.

While chunking may allow for streaming of media assets, authentication of whether a user account and/or a user device is authorized to access one or more media assets may be performed when the user device initially begins streaming the media asset. As such, at a later time, the same user account accessed from a different user device may be used to stream the same or a different media asset while the first user device is still receiving the first media asset. Therefore, rather than multiple users needing multiple user accounts, a single user account could, perhaps fraudulently, be used for access to media assets from multiple user devices. Such an arrangement may be a particular issue where a subscription (e.g., a monthly or yearly subscription) is required to access the media assets.

SUMMARY

Various arrangements for controlling access to streaming media assets during streaming are presented. In some embodiments, a method for controlling access to streaming media assets during streaming is presented. The method may include commencing transmission of a media asset to a first user device. The first user device may be linked with a user account. Transmission of the media asset may comprise sequential transmission of a plurality of media segments. The method may include receiving during transmission of the media asset to the first user device, beaconing data from the first user device. The method may include storing session information linked with the first user device and the user account. The session information may indicate the first user device and the user account have an active session of receiving the media asset. The method may include receiving authentication information linked with a second user device and the user account while transmission of the media asset to the first user device is occurring. The method may include determining the first user device is no longer permitted to receive the media asset at least partially due to the first user device no longer being permitted access to the media asset. The method may include ceasing transmission of a remainder of the plurality of media segments to the first user device. Ceasing transmission of the remainder of the plurality of media segments may result in the first user device not receiving the media asset in its entirety.

Embodiments of such a method may include one or more of the following: The method may include receiving from the first user device, authentication information linked with the first user device and the user account. The method may include transmitting at least a portion of the authentication information linked with the first user device and the user account to a content provider computer system. The method may include receiving from the content provider computer system, a response indicating the first user device is authorized to receive the media asset. The response, indicating the first user device is authorized to receive the media asset, may be received prior to commencing transmission of the media asset to the first user device linked with the user account. The method may include receiving, from an authentication computer system, authentication information indicating that the first user device is permitted to receive the media asset. The authentication computer system may determine the first user device and the user account are permitted to receive the media asset by transmitting a query to a content provider computer system and by receiving a response to the query from the content provider computer system indicating the first user device and the user account are authorized to receive the media asset. The method may include transmitting at least a portion of the authentication information linked with the second user device and the user account to the content provider computer system. The method may include receiving from the content provider computer system, a second response indicating the second user device is authorized to receive a second media asset. The media asset may be a video accessible via a subscription. At least a subset of the plurality of media segments may be encrypted when transmitted to the first user device. The method may include commencing transmission of a second media asset to the second user device linked with the user account. Transmission of the second media asset may be commenced after transmission of the remainder of the plurality of media segments is ceased to the first user device.

In some embodiments, a computer system for controlling access to streaming media assets during streaming may be presented. The computer system may include a network interface. The computer system may include a memory configured to store one or more of a plurality of media segments. The computer system may include a processor communicatively coupled with the memory and the network interface. The processor may be configured to cause the computer system to cause transmission of a media asset to a first user device to commence. The first user device may be linked with a user account. Transmission of the media asset may comprise sequential transmission of the plurality of media segments. The processor may be configured to cause the computer system to receive during transmission of the media asset to the first user device, beaconing data from the first user device. The processor may be configured to cause the computer system to store session information linked with the first user device and the user account. The session information may indicate the first user device and the user account have an active session with the computer system. The processor may be configured to cause the computer system to control access by any additional user devices linked with the user account to one or more streaming media assets at least while the session information indicates the user account has the active session with the computer system. The one or more streaming media assets may comprise the media asset.

Embodiments of such a computer system for controlling access to streaming media assets during streaming may include one or more of the following: The processor may be further configured to receive, from the first user device, authentication information linked with the first user device and the user account. The processor may be further configured to cause at least a portion of the authentication information linked with the first user device and the user account to be transmitted to a content provider computer system. The processor may be further configured to receive a response indicating the first user device is authorized to receive the media asset. The response indicating the first user device is authorized to receive the media asset may be received prior to commencing transmission of the media asset to the first user device linked with the user account. The processor may be further configured to receive authentication information indicating that the first user device is permitted to receive the media asset. The authentication information may be received from an authentication computer system. The authentication computer system may determine the first user device and the user account are permitted to receive the media asset by transmitting a query to a content provider computer system and by receiving a response to the query from the content provider computer system indicating the first user device and the user account are authorized to receive the media asset. The processor may be further configured to receive authentication information linked with a second user device and the user account. The processor may be further configured to deny access to the second user device at least while the session information indicates the first user device linked with the user account has the active session with the computer system. The processor may be further configured to receive authentication information linked with a second user device and the user account. The processor may be further configured to cause transmission of a remainder of the plurality of media segments to the first user device to cease. Ceasing transmission of the remainder of the plurality of media segments may result in the first user device not receiving the media asset in its entirety. The media asset may be a video accessible via a subscription. At least a subset of the plurality of media segments may be encrypted when transmitted to the first user device. The processor may be further configured to cause transmission of a second media asset to the second user device linked with the user account to commence. Transmission of the second media asset may be commenced after the computer system ceases transmission of the remainder of the plurality of media segments to the first user device.

In some embodiments, a computer program product residing on a non-transitory processor-readable medium is presented. The computer program may comprise processor-readable instructions configured to cause a processor to cause transmission of a media asset to a first user device to commence. The first user device may be linked with a user account. Transmission of the media asset may comprise sequential transmission of a plurality of media segments. The processor-readable instructions may be configured to cause the processor to receive during transmission of the media asset to the first user device, beaconing data from the first user device. The processor-readable instructions may be configured to cause the processor to store session information linked with the first user device and the user account. The session information may indicate the first user device and the user account have an active session with the computer system. The processor-readable instructions may be configured to cause the processor to control access by any additional user devices linked with the user account to one or more streaming media assets at least while the session information indicates the user account has the active session with the computer system. The one or more streaming media assets may comprise the media asset.

Embodiments of such a computer program product may include one or more of the following: The processor-readable instructions may be configured to cause the processor to receive from the first user device, authentication information linked with the first user device and the user account. The processor-readable instructions may be configured to cause the processor to cause at least a portion of the authentication information linked with the first user device and the user account to be transmitted to a content provider computer system. The processor-readable instructions may be configured to cause the processor to receive a response indicating the first user device is authorized to receive the media asset. The response indicating the first user device may be authorized to receive the media asset is received prior to commencing transmission of the media asset to the first user device linked with the user account. The processor-readable instructions may be configured to cause the processor to receive authentication information indicating that the first user device is permitted to receive the media asset. The authentication information may be received from an authentication computer system. The authentication computer system may determine the first user device and the user account are permitted to receive the media asset by transmitting a query to a content provider computer system and by receiving a response to the query from the content provider computer system indicating the first user device and the user account are authorized to receive the media asset. The processor-readable instructions may be configured to cause the processor to receive authentication information linked with a second user device and the user account. The processor-readable instructions may be configured to cause the processor to deny access to the second user device at least while the session information indicates the first user device linked with the user account has the active session with the computer system. The processor-readable instructions may be configured to cause the processor to receive authentication information linked with a second user device and the user account. The processor-readable instructions may be configured to cause the processor to cause transmission of a remainder of the plurality of media segments to the first user device to cease. Ceasing transmission of the remainder of the plurality of media segments may result in the first user device not receiving the media asset in its entirety.

BRIEF DESCRIPTION OF THE DRAWINGS

The present disclosure is described in conjunction with the appended figures.

Figure 1:
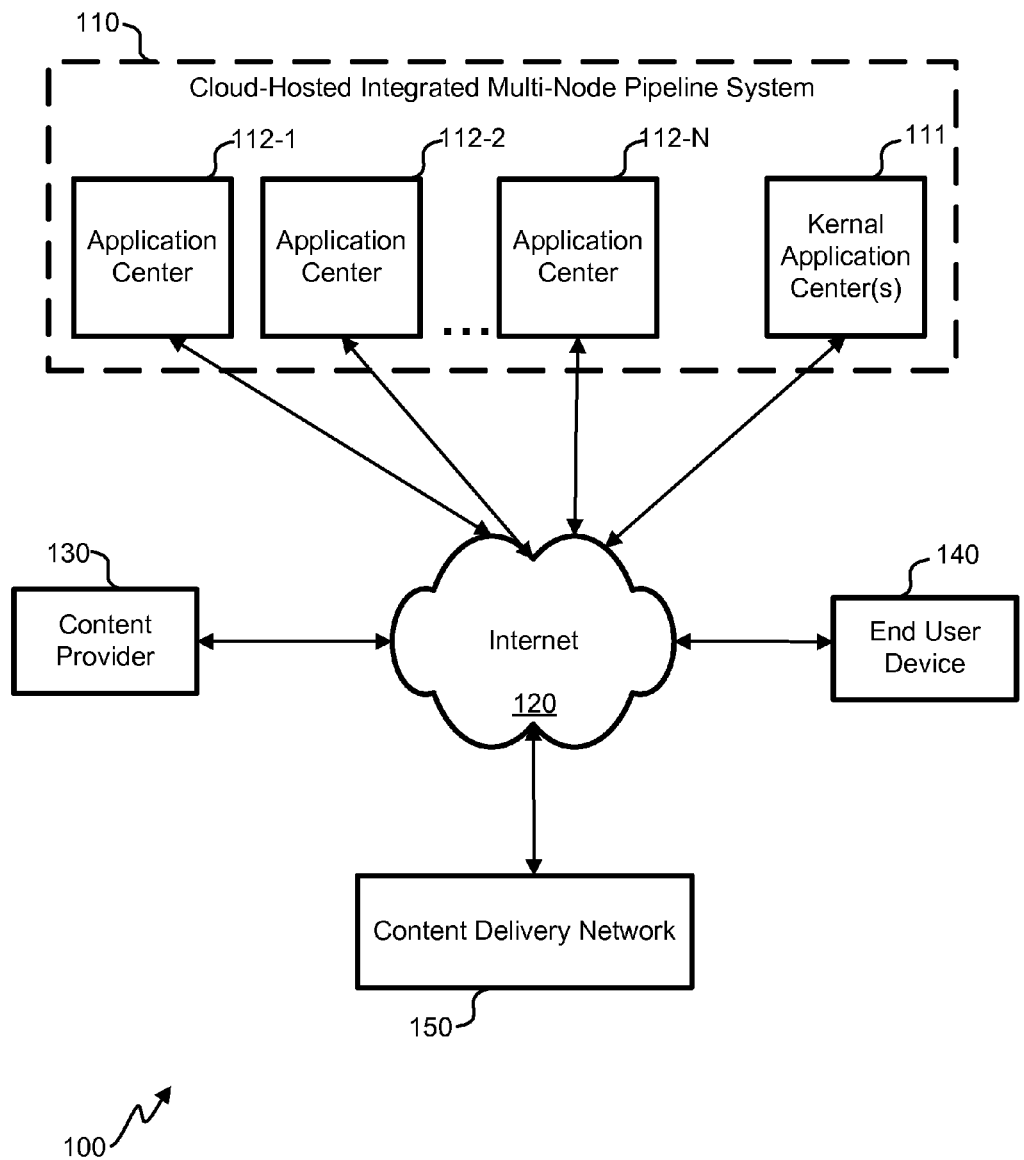
FIG. 1 illustrates a block diagram of an embodiment of a media servicing system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

The increased availability of media content (e.g., video, audio) over data communications networks such as the Internet has mirrored the increased bandwidth for these networks. Because media has recently taken a more prominent role in data communications, the distribution of media and the data associated with such distribution has become increasingly important, particularly to media content providers. Media streaming has become a widely-used method of media distribution; however security remains a significant concern. For content providers, that is, the entities that produce the media (e.g., musicians, film companies, television production studios) control over who has access to their content is important. Further, for successful implementation of subscription and pay-per-view media streaming, it may be necessary that only users having valid accounts (e.g., accounts where the subscription fee or pay-per-view fee has been paid) should be permitted access to the streaming media assets (e.g., streaming audio files, streaming video files).

As an example of a situation resulting in security concerns over streaming media assets, consider a subscription-based Internet video streaming service. When a user initially desires to begin streaming a media asset, such as a video file, the user may provide identification information to the video streaming service. This identification information may include a username, password, identification of the user device the user is using to access the video streaming service and/or any other information necessary to properly identify the user. The video streaming service may then confirm the identity of the user. If the information provided is linked to a valid subscription, the user ma be permitted to commence streaming the video file.

The streaming of the video file may be performed by an entity and/or computer system other than was used to confirm the identity of the user. As such, once the user's account information has been initially confirmed, there may be no further checks while the video is being streamed as to whether the user is still authorized to access the streaming video or if the streaming of the video is on-going (for example, the user may stop playback of a video five minutes into a two hour video).

Continuing with this example, because the first computer system and/or first entity that confirmed the user account information may be separate from a second computer system and/or second entity that is transferring the video stream to the user device, it may not be possible for the first entity to know whether the transfer to the user device is ongoing or has ceased (for example, the playback of streaming video may have been stopped by a user on the first user device five minutes into a two hour video or the user may permit the video to play in its entirety). Therefore, an attempt to gain access to the subscription-based Internet video streaming service from a second user device using the same user account may permit some other person to stream media from the video streaming service to the second user device while the first user device is still receiving streaming video. In other words, one account may be used to concurrently access the video streaming service from multiple user devices against the business desires of the video streaming service.

Such a situation may be common where two or more people decide to "share" a subscription so that each person has to pay less than the full monthly subscription rate (or one person pays while others get "free" access). Despite the two or more persons being at different physical locations and using different user devices to access the video streaming service, because each user's identity may only be confirmed when the video is initially authorized for streaming, it may be difficult to determine whether multiple users are (illegitimately) attempting to use the same account or if a single user has ceased access via a first user device and is now attempting to (legitimately) access the video streaming service via another user device. Certain systems and methods can be utilized, however, to increase security for such media streaming services.

Once authorization has initially been confirmed, as a media asset is streamed to a user device, state session information may be maintained by the system that is streaming the media asset to the end user device. This state session information may contain information identifying the user, the user account, and/or the user device currently receiving the media asset. Further, the state session information may indicate whether the user device is actively receiving the media asset (e.g., transfer of chunks of the media asset to the end user is on-going) or transfer of the media asset has ceased (e.g., the user has either paused or stopped playback of the media asset). If another user device attempts to stream a media asset (which may be the same or different from the first media asset), the system may determine whether this second user device is linked with a user account already receiving a streaming media asset based on stored session information. If not, the media asset may be streamed. However, if another session currently is linked with the same user account, only one of the user devices may be permitted to receive a streaming media asset at a given time. As such, either the second user device may be blocked from receiving a streaming media asset and the first user device is permitted to continue receiving the media asset or the second user device is permitted to receive a streaming media asset and playback of the media asset on the first user device is ceased (before streaming of the media asset to the first user device is complete).

While the above embodiments may be implemented in a variety of different systems, some particular embodiments may be implemented as part of a media service system. FIG. 1 is a block diagram illustrating a media servicing system 100, according to some embodiments. The system may deliver media content to the end user device 140 through a network such as the Internet 120. The end user device 140 can be one of any number of devices configured to receive media over the Internet 120, such as a mobile phone, tablet computer, personal computer, portable media device, etc. A media asset provided by a content provider 130 can be processed and indexed by cloud-hosted integrated multi-node pipelining system (CHIMPS) 110, and further stored on content delivery network (CDN) 150. Additionally or alternatively, the CHIMPS 110 may also be adapted to store the media asset.

The media servicing system further enables a content provider 130 or other entity to gather information regarding user behavior during media playback. For example, a content provider 130 can be provided with data indicating that end users tend to stop watching a video at a certain point in playback, or that users tend to follow links associated with certain advertisements displayed during playback. With this data, a content provider 130 can adjust factors such as media content, advertisement placement and content, etc., to increase revenue associated with the media content and provide the end user device 140 with a more desirable playback experience.

End user device 140 can request a media asset to stream with a client program executed by the end user device 140. The client program can be, for example, a media player, browser, or other application adapted to request and/or play media assets. In response to a request for a media asset, the CHIMPS 110 can utilize any number of application centers 112 and/or kernel application center(s) 111 to provide the client program with a data object concerning the requested media asset. The data object can include information about the media asset, including where the media asset can be located, such as within the CDN 150 or within the CHIMPS 110 itself. Location information may be provided by Universal Resource Indicator (URI), a Universal Resource Locator (URL) or other indicator. During playback of the media asset, the CHIMPS 110 can collect data regarding the playback through beaconing provided by a client program executed by the end user device 140 and/or indexing service from within the CHIMPS and/or CDN. The CHIMPS 110 can subsequently provide the data and/or any analytics information derived from the data to the content provider 130.

Figure 2A:
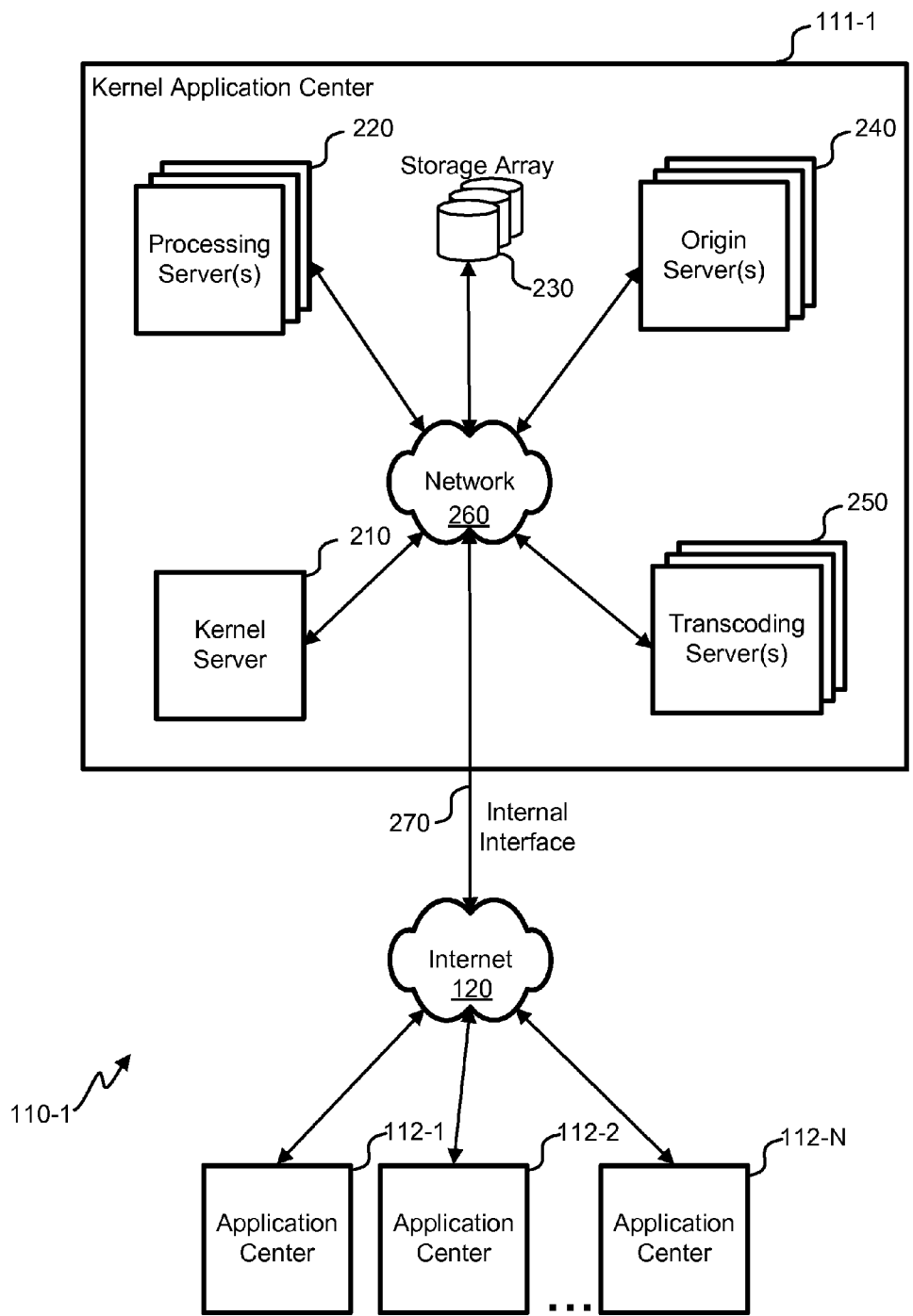
FIG. 2A illustrates a block diagram of an embodiment of a kernel application center connected with application centers.

FIG. 2A is a block diagram illustrating an embodiment of a kernel application 111-1 center connected with application centers from within the CHIMPS 110-1. The kernel application center 111-1 and application centers 112 can be geographically distant and can be connected via the Internet 120, wide area network (WAN), and/or other data communication network. Because application centers can be geographically separated, DNS services (not shown) can be used to allow an end user device 140 to connect to the nearest available application center 112. The kernel application center 111-1 can connect with application centers 112 within the CHIMPS 110-1 through an internal interface 270, thereby enabling the application centers 112 access to the various components within the kernel application center 111-1.

Components within the kernel application center 111-1 can communicate through network 260 such as a local area network (LAN) and can include one or more origin servers 240 and a storage array 230 with which data objects and/or media assets may be stored and distributed. The storage array 230 may also be utilized by services running on processing server(s) 220 and/or transcoding server(s) 250 that may require temporary or long-term storage. Kernel server 210 can utilize processing server(s) 220, transcoding server(s) 250 to provide various functional capabilities to the CHIMPS 110.

For example, as described in more detail below, the CHIMPS 110-1 can provide transcoding service for media assets provided by a content provider 130 for syndication. Such a service can allow a content provider 130 to upload a media asset to an application center 112, after which the application center 112 would notify the kernel server 210 that the media asset has been uploaded. The kernel server can then notify services running on the processing server(s) 220 of the upload. These services can utilize transcoding server(s) to transcode the media asset, which can then be moved to a CDN and/or stored locally by storage array 230 and origin server(s) 240. Services running on the processing server(s) 220 can also update the associated data object stored by the storage array 230 and origin server(s) 240.

Figure 2B:
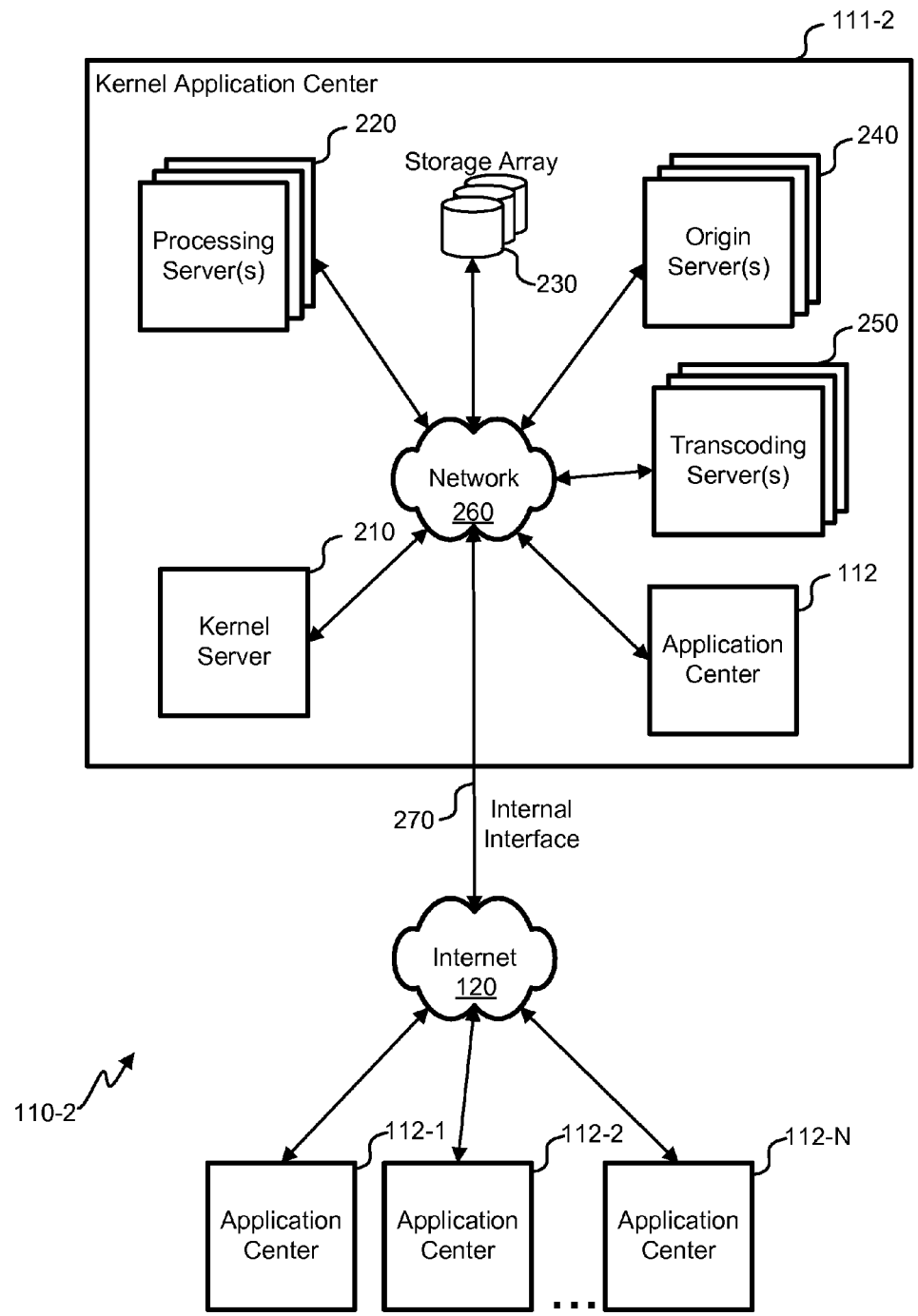
FIG. 2B illustrates a block diagram of an embodiment of a kernel application center.

FIG. 2B is a block diagram illustrating an alternative embodiment of a kernel application center 111-2. In addition to the components of the embodiment of FIG. 2A, this embodiment incorporates an application center 112 within the kernel application center 111-2. The application center 112 incorporated within kernel application center 111-2 may be located at or near the other components of the kernel application center 111-2, and can be communicatively connected to the other components via network 260. The incorporated application center 112 can therefore have faster access to kernel application center functionality because it does not need to communicate over long distances. In consideration of this advantage, it will be understood that the CHIMPS 110 can include multiple kernel centers with one or more application centers incorporated therein. Additionally or alternatively, components of the kernel application center may be incorporated into one or more application centers 112 in the CHIMPS 110 to provide quicker access to certain functionality.

Figure 3:
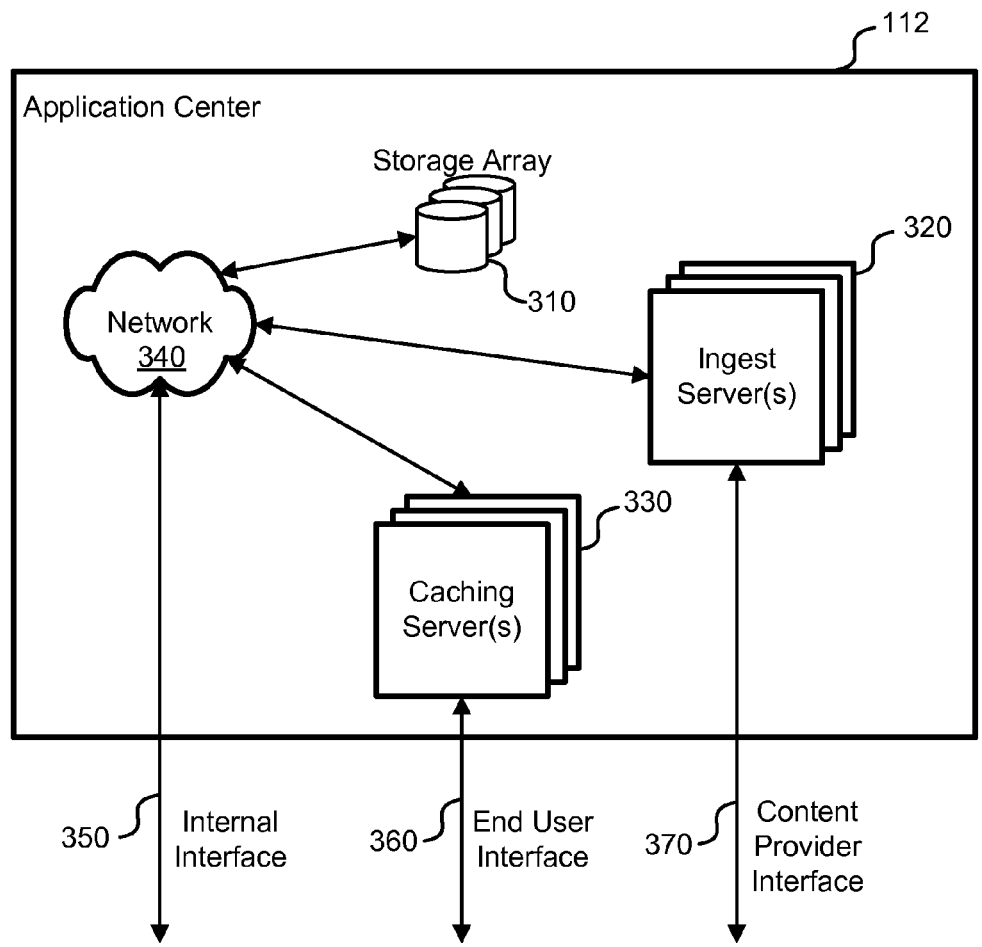
FIG. 3 illustrates a block diagram of an embodiment of an application center.

FIG. 3 is a block diagram illustrating an embodiment of an application center 112. The application center 112 can include caching server(s) 330 and a storage array 310 for storing and distributing data objects of media assets requested by end user devices through end user interface 360. Caching server(s) 330 and storage array 310 can also be used to collect, process, and/or store metrics information from beaconing data, media chunk requests, and/or other data sources, including data collected through end user interface 360. The application center can further include ingest server(s) 320 for ingesting uploaded media assets from a content provider 130 through a content provider interface 370. The media assets may be stored on the storage array 310. As with the kernel application center 111, the components of the application center 112 can be communicatively linked through a network 340, such as a LAN. The application center can further include an internal interface 350, providing a communication link from the application center to the rest of the CHIMPS. It is through internal interface 350, for example, that media assets stored on storage array 310 can be made available to a kernel application center 111 for services such as transcoding.

Figure 4:
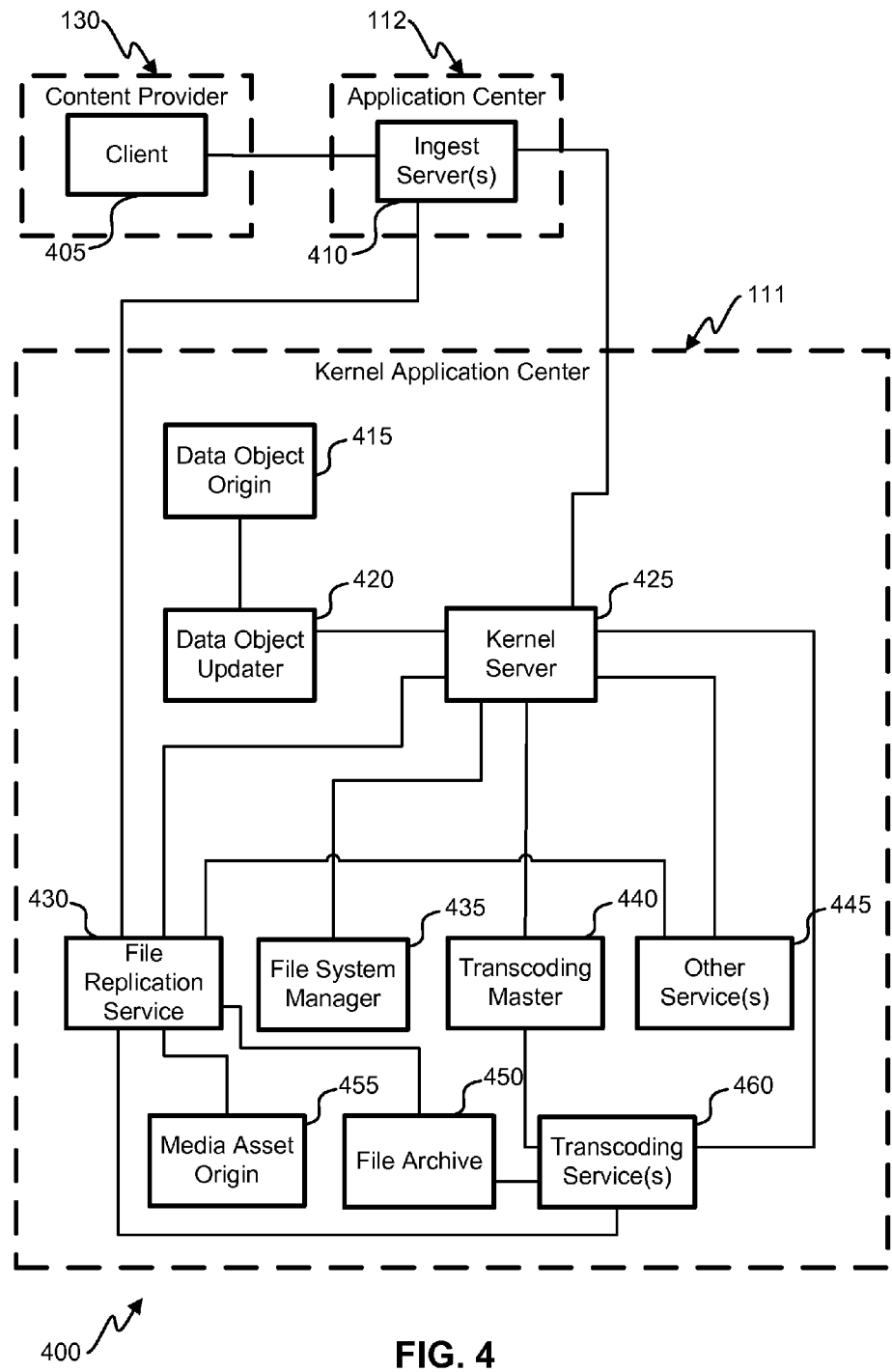
FIG. 4 illustrates a block diagram of an embodiment of processes and objects utilized by a cloud-hosted integrated multi-node pipelining system for media ingestion.

FIG. 4 is a block diagram 400 of processes and objects utilized by the CHIMPS 110 for media ingestion, according to some embodiments. Although FIG. 4 further indicates the physical systems which may execute or store these processes and objects, it will be understood that the processes and objects disclosed may be executed or stored on more than one system, including systems not disclosed in FIG. 4. In other words, the processes and objects shown in FIG. 4 allow for a variety of implementations through one or more of hardware, software, firmware, microcode, etc.

Media can be ingested into the CHIMPS 110 when a content provider 130 uploads a media asset to ingest server(s) 410 in an application center 112 by utilizing a client 405. The client 405 can be a stand-alone application or browser based, for example, and can communicate with ingest server(s) 410 through an application programming interface (API) configured for the ingestion of media assets.

Ingest server(s) 410 can communicate with devices in the kernel application center 111 executing programs such as kernel server 425 and file replication service 430. The kernel server 425 can be configured to organize the workflow among services such as transcoding master 440, file system manager 435, and other services 445 (e.g., analytics, dynamic API, etc.). Upon a particular event, for example, the kernel server can be configured to notify the relevant services of the event, causing the services to process tasks associated with the event.

The file replication service 430, under direction of the kernel server 425, can coordinate the movement of the media assets between services. For example, retrieving the uploaded media asset from the ingest server(s) 410 and storing it on the file archive 450, or retrieving transcoded media assets from transcoding server(s) 460 and storing them in the media asset origin.

The data object updater 420 keeps the data object origin 415 up to date in response to any changes in the system. When, for example, a file is uploaded, transcoded, and stored in media asset origin 455, the location and other metadata concerning the transcoded media assets need to be created or updated in the data object origin 415 to ensure an end user device that accesses the object in the data object origin 415 has the correct information regarding the related media asset. Because the data object updater 420 receives updates from the kernel server 425 (which is notified when a transcoded media asset is stored in the media asset origin 455), the system ensures the data objects in the data object origin are constantly up to date.

The upload of a media asset to the ingest server(s) 410, as described above, can provide an example of how the kernel server 425 may coordinate workflow. For instance, in response to the upload, the ingest server(s) 410 can notify the kernel server 425 that a media asset has been uploaded. The kernel server 425 informs the file replication service 430 of the uploaded media asset, and the file replication service 430 moves the uploaded media asset into the file archive 450 and notifies the kernel server 425 of the move. In response, the kernel server 425 notifies the file replication service 430, the file system manager 435, and the transcoding master 440 of the move. The file replication service 430 then will know it can delete the uploaded media asset from the ingest server(s) 410, the file system manager 435 will update the file system accordingly, and the transcoding master 440 will notify transcoding service(s) 460 of different transcoding tasks to be performed. The transcoding service(s) 460 can then retrieve the uploaded media asset from the file archive 450 to create transcoded media assets. The transcoding service(s) 460 notify the kernel server 425 once transcoding is complete, and the kernel server 425 relays this information to the file replication service 430. The file replication service 430 then takes the transcoded media assets from the transcoding services 460 and moves them to the media asset origin 455. Once the file replication service 430 notifies the kernel server 425 of the move, the kernel server 425, in turn, notifies the file replication service 430 and the data object updater 420. The data object updater 420 updates the data object origin 415 accordingly, and the file replication service 430 deletes the transcoded media assets from the transcoding services 460.

The modular nature of the system enables all tasks associated with an event to be completed quickly. As illustrated in the example above, workflow relating to a particular event, such as a media asset upload, can be spread among the various services simultaneously. Moreover, because the system's modularity enables it to be scaled to accommodate differing hardware capacities, and because the system can be configured to dynamically allocate hardware to different services according to the needs of the system, the speed of completing tasks relating to a particular event can further be increased. For example, a server of the CHIMPS 110 can be configured to dynamically switch its purpose based on external conditions such as load and overall system performance, providing functions such as transcode, upload, metrics collection, application web service, and more, on an as-needed basis.

Figure 5A:
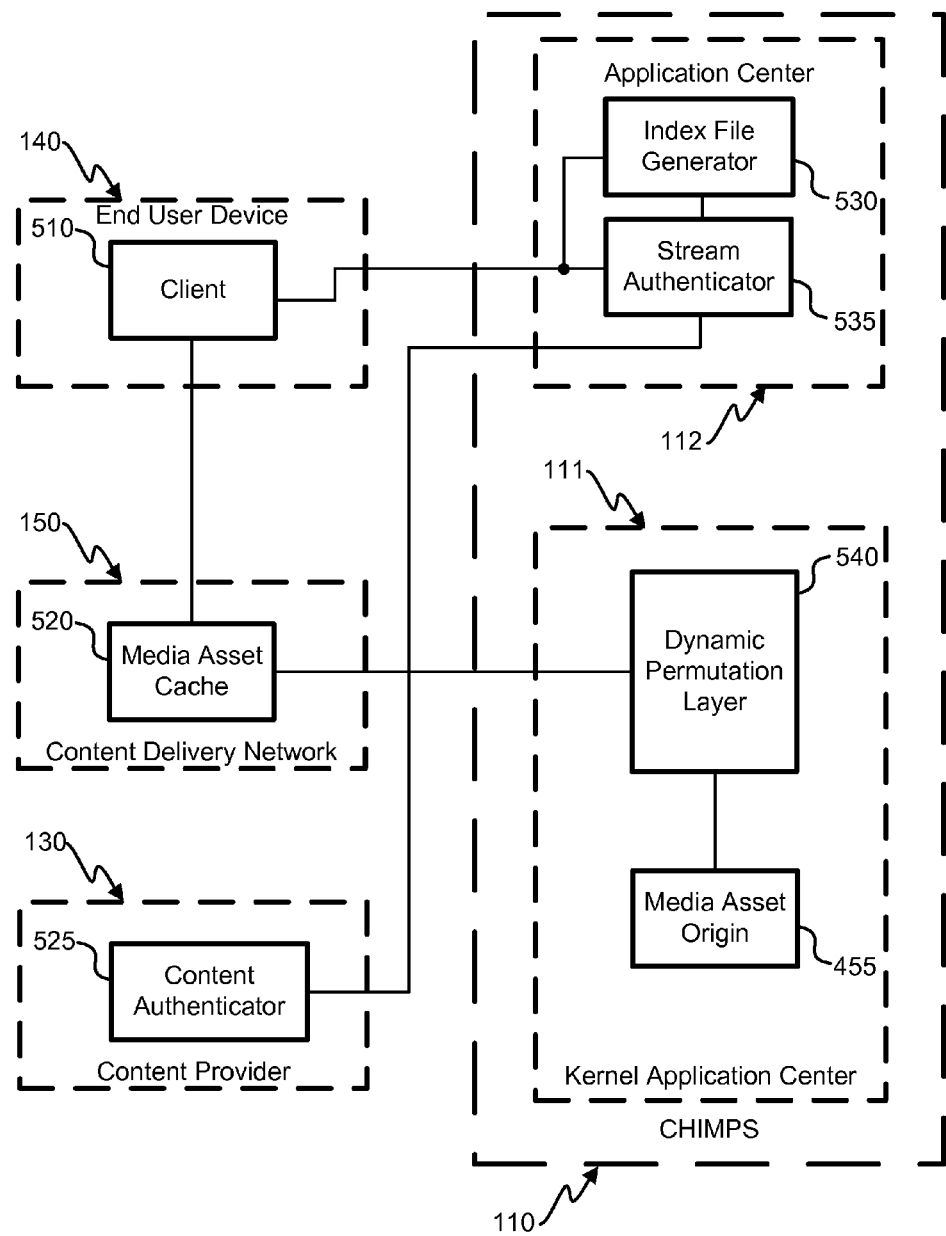
FIG. 5A illustrates a block diagram of an embodiment of a system that controls access to streaming media assets via a content delivery network.

Embodiments of such systems may include other systems that manage various requests from end users. For example, a system that controls access to streaming media files may also generate dynamic index files and chunk media files. Referring to FIG. 5A, an embodiment of such a system 500-1 is illustrated. Media assets may be streamed to end user device 140 using a client 510. As mentioned above, the client 510 can be a stand-alone media player, a plug-in, a browser, or other application, which can be executed on a personal computer or other electronic device. For the sake of simplicity, communication with end user device 140 is to be understood to possibly involve communication with client 510.

An index file generator 530 can be a program instantiated for media streaming to a particular end user device 140. The index file generator 530 can be executed on a server or other computing device within an application center 112 of CHIMPS 110. Index files generated by the index file generator can include a wide variety of information such as starting, ending, and/or run times for media chunks and locations for media chunks. This information can be embedded in a single string of data, such as a URI or a URL. If media includes various sub-streams (e.g., streams with alternative bitrates, captions, alternative languages, etc.) the index file can include data for chunks corresponding to each of the alternative sub-streams, as well as information regarding the bitrate and/or other unique information for each stream. Alternatively or in addition, index files indicating alternative sub-streams may be separate from index files indicating one or more media chunks for streaming.

It should be understood that the index file can further comprise a wide variety of formats, which can depend on the particular protocol. HTTP streaming may, for example, require index files to comprise one or more of M3U, M3U8, XML, and XML-based formats. Of course, other formats can be used in accordance with relevant streaming protocols.

In order to determine whether a user, user account, and/or an end user device has an active streaming session, "beaconing" data transmitted by the end user device may be received and analyzed to determine the state of the media streaming session. Because not all media player applications actively provide beaconing data, data gathered by the index file generator can serve as beaconing data. For example, if a request is made for a chunk that does not immediately follow a previously-requested chunk, it can be inferred that a skip was made in the playback sequence of the streaming media. If the amount of time elapsed between a previous request for a chunk or index file and a subsequent request for a chunk or index file exceeds the time for playback of the previously-requested chunk or index file, it can be inferred that a pause was made in the playback of the streaming media. If a request is not received within a certain time since a prior request, it can be determined that a stop was made in the streaming media. A stop (or pause) of a certain duration may result in a session being identified as no longer active (e.g., inactive).

As noted above, the state of a client may be determined from a variety of factors. This can include when the request for the index file is received by an index file generator, when the index file is provided to the end user device, a length of time to play back the segment of streaming media, and/or the starting and/or ending point of the segment of media for streaming. The determined state of a client may also be based on whether the request for the index file has been received within a certain amount of time since receipt of a previous request for an index file, whether the segment of media for streaming includes media other than the media file, and more. The state of a client and/or the data from which it was determined, may be used to create reporting data to serve as a substitute or complement to beaconing data from a client media player application. Because the index file generator can determine the length of the chunks, it therefore can determine the frequency of subsequent index file requests and the resolution of the reporting data based on the requests. The index file generator may log the reporting data and/or transmit the reporting data over a network during streaming. Such reporting data may be stored as active streaming session data by a storage arrangement within application center 112 (or elsewhere within CHIMPS 110) such as by stream authenticator 535.

The determined state of a client may be used by the index file generator and/or other services for various purposes. For example, it may be used to determine whether the client device is currently being used to watch a streaming media asset or if the user has ceased (e.g., paused, stopped) playback. The state of a client further may be used to support resume features on a per client basis, allowing a user to continue playback of a media asset from a point at which the user had previously stopped playback. The state of a client also may be used to support individual encryption keys in an encryption scheme and allow the index file generator to return secure URLs (e.g., time expiring or Internet Protocol (IP) allowed) for chunks to support functions such as payment services. The above represents a brief description of indexing and beaconing, and how data related to beaconing may be used. Further information may be found in the applications previously incorporated by reference.

Table 1 illustrates a simplified example of an generated index file in M3U9 format, indicating a chunk of media for streaming. The index file in this example provides a URI for a chunk of media. The URI indicates the chunk is 10 seconds long, starting at 9 seconds into the media file and ending 19 seconds into the media file.

TABLE 1

Example Index File Contents

EXTM3U
EXT-X-MEDIA-SEQUENCE:1
EXT-X-TARGETDURATION:10
EXTINF:10,
http://video.example.com/seg/9/19/seg1.ts Referring again to FIG. 5A, the index file generator 530 can also include an indicator within an index file to indicate whether a chunk of media is to be dynamically created. If, for example, it is determined that a requested media asset has not been chunked and that the asset will be chunked dynamically, the index file generator can include the indicator in data corresponding to a chunk of media to be created. The indicator, which can be as simple as including the term "/seg/" in a URL, will indicate that a requested chunk of media needs to be generated.

The system 500-1 can be configured such that the kernel application center 111 provides dynamically-created chunks of media to CDN 150 for delivery to client 510. CDN 150 can store the chunks locally in, for example, a media asset cache 520, thereby forgoing the need to dynamically create a chunk again if the same chunk is requested in the future.

In sum, the system 500-1 can, after receiving a request for an index file from a client 510, dynamically generate an index file with an index file generator 530. The index file can, among other things, indicate where a next chunk of media may be located. A client can then request the chunk from the location indicated by the index file, which can comprise a media asset cache 520 in a CDN 150. If the chunk is not found in the media asset cache 520, the cache miss can redirect the request to dynamic permutation layer 540, which can dynamically generate the requested chunk of media by accessing the corresponding media asset in a media asset origin. The requested media chunk can then be provided to CDN 150 for storage in the media asset cache 520 and delivery to the client 510. If the same chunk is requested at a later point in time, CDN 150 can deliver the chunk from the media asset cache 520, thereby forgoing the need to redirect the request to dynamic permutation layer 540 to regenerate the chunk.

System 500-1 may include a content provider 130 that maintains a content authenticator (CA) 525 that is in communication with CHIMPS 110. CA 525 may be a computer system that performs one or more additional functions. CA 525 may serve to receive and respond to requests from CHIMPS 110 as to whether a user account, user, client, and/or end user device is authorized to receive a streaming media asset. Specifically, CA 525 may be in communication with a server in application center 112 of CHIMPS 110. For example, CA 525 may communicate with stream authenticator 535 of application center 112.

Stream authenticator 535 may be a standalone computer system or may be combined with another computer system that performs one or more other functions, such as index file generator 530. Stream authenticator 535 may receive authentication information from end user devices, such as end user device 140. Some or all of this user authentication information may be transmitted to an associated content provider for authentication, such as content provider 130. The authentication information may be sent to the appropriate content provider based on an indication from end user device 140 and/or what media asset has been requested by end user device 140. CA 525 may receive the authentication information and analyze whether the authentication information is sufficient for the requesting end user device and associated user to be granted access to the requested media assets or group of media assets. For instance, CA 525 may determine whether the authentication information received is linked with a valid subscription account. If not, CA 525 may respond to stream authenticator 535 indicating that the session is to be denied. If the authentication information is acceptable to CA 525, CA 525 may respond to stream authenticator 535 indicating that a session may be commenced.

Stream authenticator 535 may also analyze the authentication information received from end user device 140. Stream authenticator 535 may store information regarding sessions with various end user devices. This session information may be augmented with information that indicates various identifiers (e.g., users, usernames, user accounts) and whether each session is active or not. Table 2 provides an example of session information which may be maintained by stream authenticator 535. Information regarding whether a session is active or not may be based on beaconing data received by index file generator 530 from end user device 140. Based on requests for chunks and/or index files, it may be possible for session information to be updated by index file generator 530 (or stream authenticator 535 or some other component of CHIMPS 110) to indicate whether a session is active or not. For example, the session information may indicate when the previous index file was requested. From this, it may be deduced whether the end user device is actively playing back the streaming media asset.

TABLE 2

| Username | Device Type | Media Asset | Session State |
|---|---|---|---|
| MES_613 | tablet | Movie123.vid | Active |
| TJS2727 | computer | 324jfdei.mov | Inactive (5:34) |
| Pionreski | computer | Movie123.vid | Active |

In some embodiments, stream authenticator 535 may transmit relevant session information to CA 525 concurrently with, before, or after transmitting authentication information linked with end user device. For example, the relevant session information may indicate how many (e.g., 0, 1, 2, 3, etc.) active sessions are currently linked with the user account indicated by the session information. CA 525, using the authentication information and the relevant session information, may make the determination as to whether a session with end user device 140 should be permitted. For example, in some instances, more than one session may be permitted for a single user account. The user may have had the option of paying an additional fee such that two (or more) concurrent sessions of streaming media linked with one user account may be permitted. As such, CA 525, using the session information provided by stream authenticator 535, may be able to determine whether or not to allow the session.

In some embodiments, rather than CA 525 assessing the session information, CA 525 may only provide an indication as to whether the authentication information provided by stream authenticator 535 is valid. Stream authenticator 535 may assess whether, based on the valid authentication information of end user device 140 and/or the session information derived from index file generator 530, whether end user device 140 should be permitted to stream a media asset. For instance, stream authenticator 535, despite receiving an indication of successful authentication from CA 525, may deny a session because session information stored by application center 112 indicates another session linked with the same user account is currently active.

Various rules may be stored by stream authenticator 535 and may be used to determine whether or not a session by an end user device linked with a user account should be permitted or not. Various content providers may provide different rules. For example, some content providers may permit only one active session per user account (or per end user device), while other content providers may permit 2, 3, or more active sessions per user account (or per end user device). Additionally, a content provider may set rules such as an amount of time that must lapse between when active sessions on different end user devices linked with the same account are permitted to occur. For example, if a particular end user device just finished an active session, a minimum of five minutes may be required to elapse before streaming can be linked with the same account to another end user device. In some embodiments, rather than using content provider-specific rules, stream authenticator 535 may abide by a standard set of rules, including rules, such as: only one active session per user account.

Once authentication is completed such that CA 525 of content provider 130 and stream authenticator 535 are satisfied that end user device 140 and the associated user account are permitted to access the request media asset (or group of media assets), end user device 140 may be permitted to begin retrieving various chunks, or segments, of the media asset. Such chunks may be provided to client 510 in at least rough order such that client 510 of end user device 140 can reconstruct the segments sequentially. The index file, as discussed previously, may require client 510 of end user device 140 to obtain some or all of the segments from content delivery network 150. The locations of the segments may be noted in the index file received by client 510.

While client 510 is receiving segments of the media asset from content delivery network 150, stream authenticator 535 may store session information that indicates that end user device 140 has an active session (that is, is streaming a media asset). After a period of time, if no request for a new index file is received from client 510 by index file generator 530 (this request may serve as beaconing data), the session information indicating the session is active may be changed to inactive or removed from storage. Each time client 510 requests an updated index from index file generator, the session information may be set to active for a predefined period of time. For example, if the index file supplied to client 510 contains links to chunks sufficient for twenty second of playback, if a new index file is not requested after twenty-five seconds, the session information linked with client 510 may be changed to inactive.

Stream authenticator 535 may be configured to cease chunks from being transferred to client 510 of end user device 140 following authentication in certain circumstances. For example, if end user device 140, linked with a particular user account, is authenticated and a second end user device, linked with the same user account, is later authenticated, stream authenticator 535 may de-authenticate end user device. This may involve the first end user device being prevented from receiving additional chunks. These chunks may be blocked by not allowing index file generator 530 to provide subsequent index files to the first end user device. As such, the first end user device may be prevented from retrieving the remaining chunks of a media asset it was streaming.

Figure 5B:
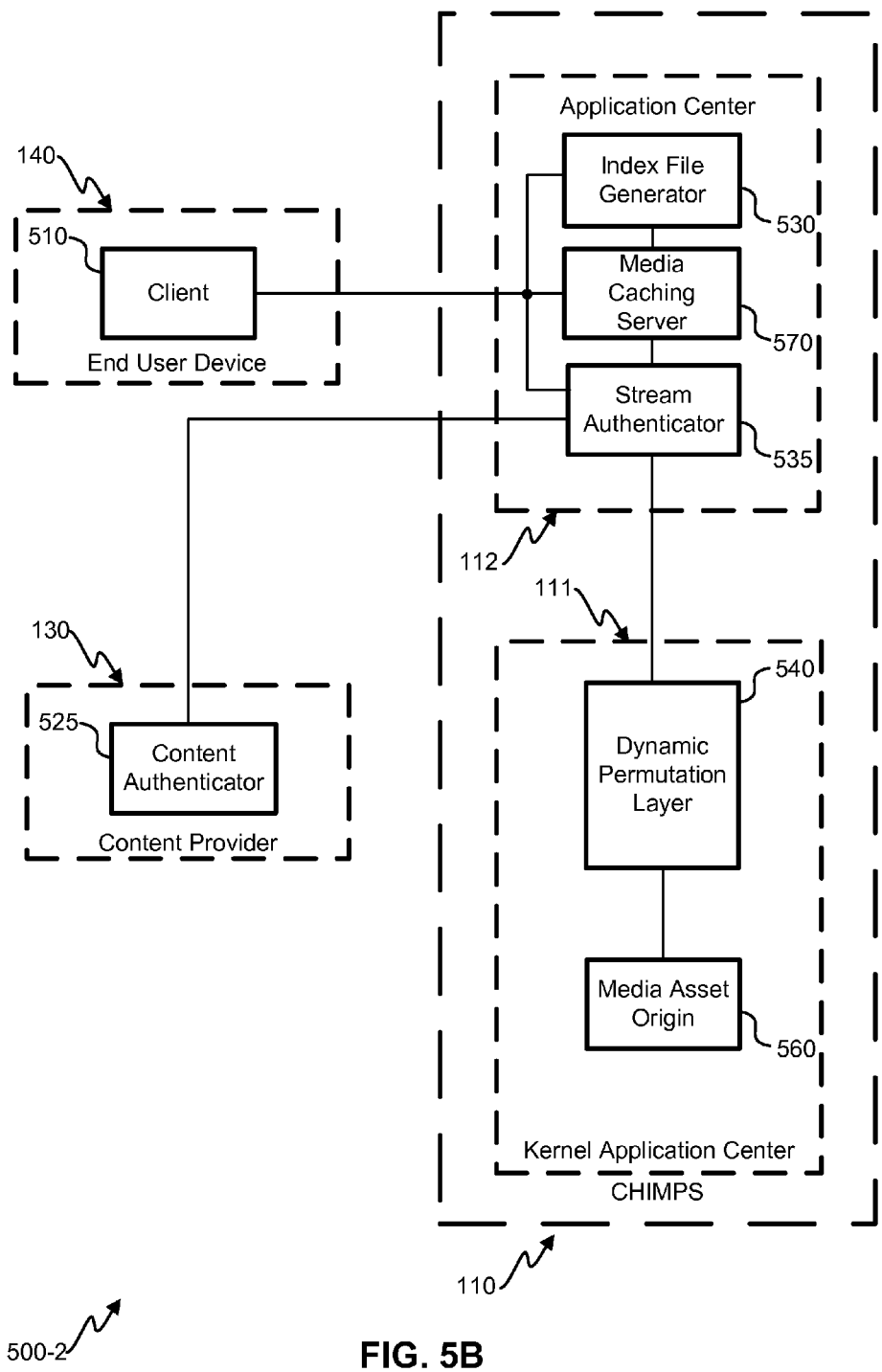
FIG. 5B illustrates a block diagram of an embodiment of a system that controls access to streaming media assets.

FIG. 5B illustrates an alternative embodiment of a system 500-2 for controlling access to streaming media. In system 500-2, rather than chunks being received by client 510 from a content delivery network (such as CDN 150), chunks are transmitted to client 510 from a media caching server 570 of CHIMPS 110 and application center 112. Media caching server 570 can receive chunk requests from and provide the corresponding chunks to clients, such as client 510 of end user device 140. While media caching server 570 is illustrated as part of application center 112, it will be understood that such a media caching server(s) or similar device(s) can be located anywhere within the CHIMPS and/or in a system(s) communicatively linked to the CHIMPS. As discussed in reference to system 500-1, authentication of end user device 140, client 510, a user account, and/or user may be necessary by both stream authenticator 535 and API server 520 before media caching server 570 transmits chunks to client 510.

Figure 5C:
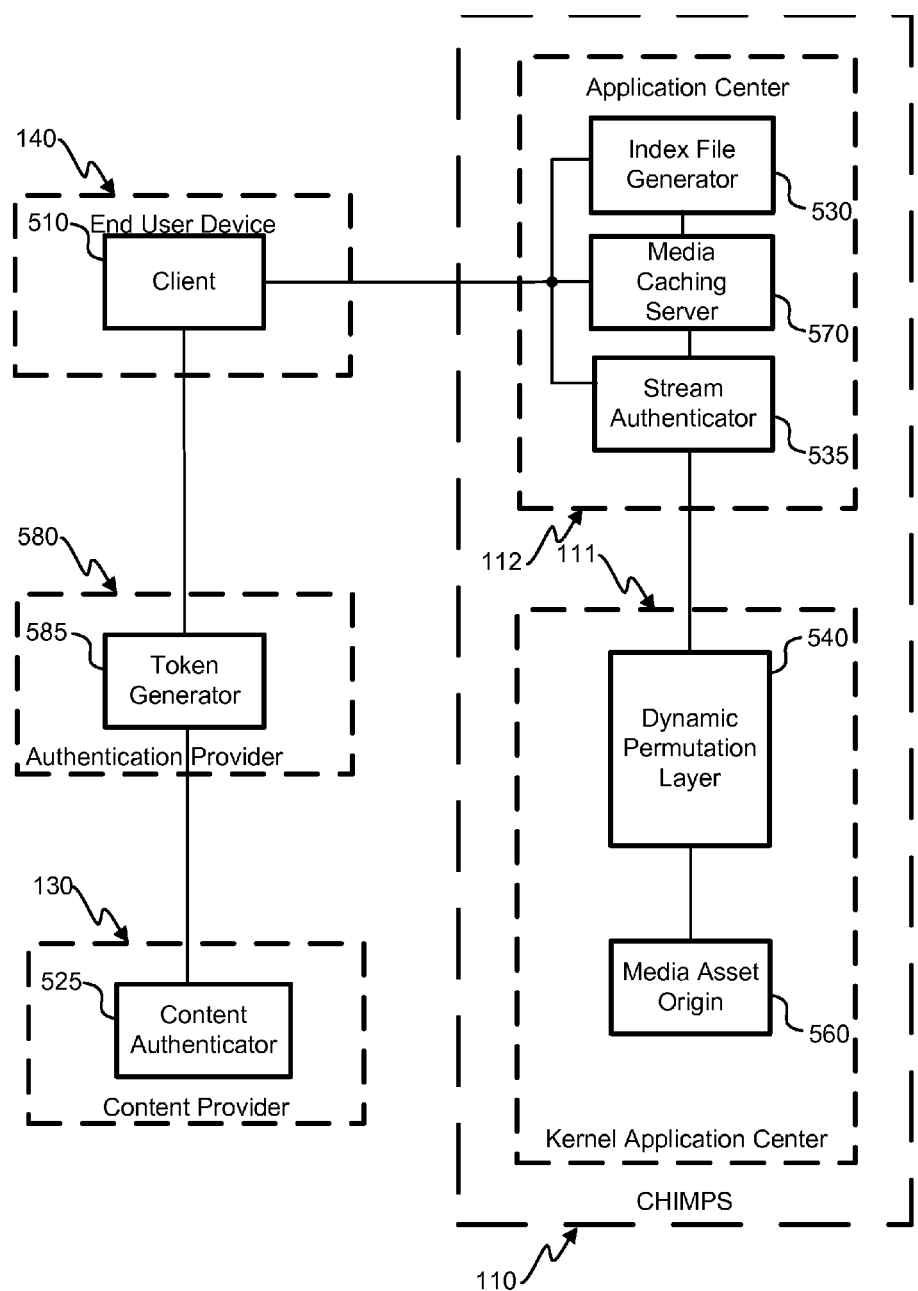
FIG. 5C illustrates a block diagram of another embodiment of a system that controls access to streaming media assets.

FIG. 5C illustrates an alternative embodiment of a system 500-3 for controlling access to streaming media. While system 500-1 and system 500-2 involved authentication information being received by stream authenticator 535, sent to CA 525, and a response being sent to stream authenticator 535, instead, embodiments of system 500-3 perform authentication via an alternative arrangement. If end user device 140 attempts to access a media asset, end user device 140 may first contact token generator 585 of authentication provider 580. Token generator 585 may be a computer system that performs one or more additional functions. Authentication provider 580 may be an independent entity that provides authentication services on behalf of other entities. For example, authentication provider 580 may provide authentication services for content provider 130, and, possibly, other content providers. In some embodiments, authentication provider is content provider 130 or token generator may be part of CHIMPS 110.

Client 510 of end user device 140 may transfer authentication information to token generator 585. Some or all of this authentication information may be sent to content authenticator 525 of content provider 130. CA 525 may determine whether or not end user device 140 is permitted to access the streaming media asset(s). A response may be transmitted from CA 525 to token generator 585. If access has been granted by content provider 130 to end user device 140, token generator 585 may transmit an appropriate token to client 510 of end user device 140. This token may contain a URI or URL that permits access to the streaming media asset. The token may be transferred by client 510 to stream authenticator 535 of CHIMPS 110. The token may include encrypted information that may be decrypted by stream authenticator 535 (or some other component of CHIMPS). The token received by stream authenticator 535 in conjunction with the session data stored by stream authenticator 535 may be used to determine whether a media asset should be streamed to client 510 of end user device 140. If streaming is to occur, media caching server 570 may transfer chunks to client 510 of end user device 140. While system 500-3 illustrates application center 112 having a media caching server 570 to transfer chunks to client 510 of end user device 140, it should be understood that other embodiments of system 500-3 may involve chunks being transferred to end user device 140 from a media asset cache 520 of a content delivery network 150.

Figure 6:
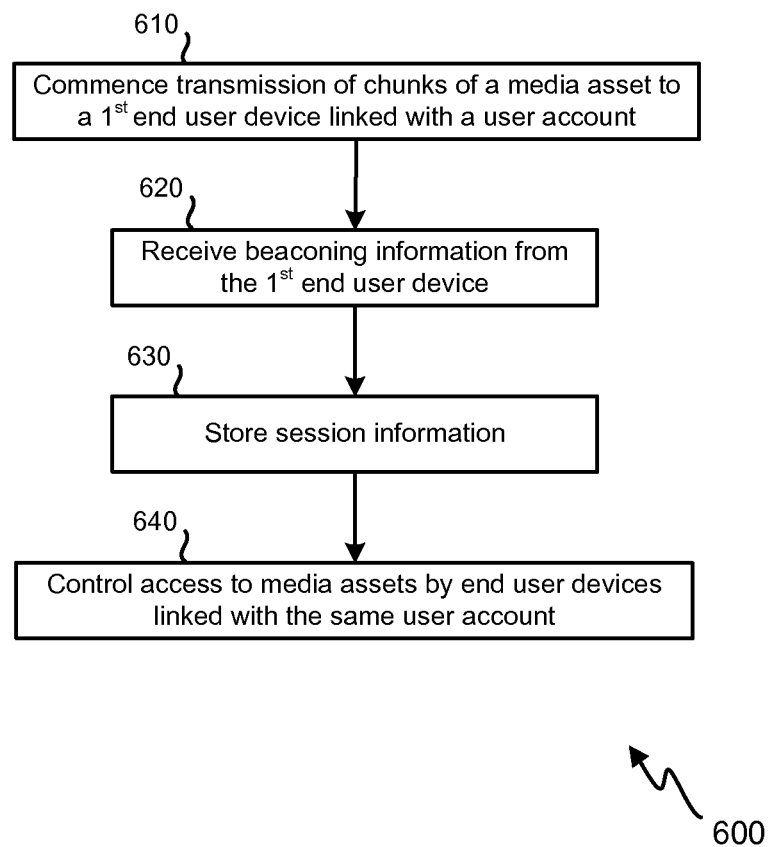
FIG. 6 is an embodiment of a method for controlling access to streaming media.

The systems of FIGS. 1-5 may be used to perform various methods. Method 600 of FIG. 6 is an embodiment of a method for controlling access to streaming media. Method 600 may be performed by the previously detailed systems, such as system 500-1, system 500-2, or system 500-3. Method 600 may also be performed by other systems for controlling access to streaming media.

At step 610, chunks of a media asset may be transmitted, by a computer system, to a first end user device linked with a user account. Referring to FIG. 5B, chunks may be transferred by media caching server 570 to client 510 of end user device 140. Periodically, the first end user device, via a client, may retrieve an index file from the computer system. Based on information present in the index file, the client of the first end user device may retrieve chunks of the media asset being streamed. The first end user device may be linked with a user account. Prior to commencing transmission of chunks of the media asset, the first end user device may have been authenticated such that a valid user account was identified as being linked with the first end user device. This may involve a valid username and password (or some other form of authentication information, such as a token or certificate) being supplied via the first end user device.

At step 620, beaconing information may be received by the computer system from the first end user device. Referring to FIG. 5B, the beaconing information may be received by index file generator 530. As previously detailed, the beaconing information may be derived from requests for chunks and/or requests for index files received by the computer system. For example, if a request is made for a chunk that does not immediately follow a previously-requested chunk, it can be inferred that a skip was made in the playback sequence of a streaming media asset. If the amount of time elapsed between a previous request for a chunk or index file and a subsequent request for a chunk or index file exceeds the time for playback of the previously-requested chunk or index file, it can be inferred that a pause was made in the playback of the streaming media asset. If a request is not received within a certain time since a prior request, it can be determined that a stop was made in the playback of the streaming media asset. A stop (or pause) of a certain duration may result in a session being identified as no longer active (e.g., inactive).

At step 630, session information may be stored by the computer system. Referring again to FIG. 5B, stream authenticator 535 (or some other component of CHIMPS 110) may store session information regarding various user accounts and/or end user devices. Such session information may detail which user accounts, users, and/or end user devices have active sessions with the computer system. If an active session becomes inactive, the associated session information may detail when the session changed to the inactive state.

At step 640, access to one or more media assets by end user devices linked with the same user account may be controlled. Access may be based on the session information linked with the first end user device and the user account. If, according to rules maintained by the computer system or by a content provider, only one end user device linked with a particular user account is permitted access to a media asset or group of media assets at a time, end user devices linked with the user account besides the first end user device may be prevented from accessing media assets at least while session information indicates that the first end user device linked with the user account has an active session with the computer system.

In some embodiments, according to rules maintained by the computer system or a content provider, if a second end user device linked with the user account is successfully authenticated subsequent to authentication of the first end user device, the first end user device may be prevented from receiving further chunks. As such, the transmission of chunks of a media asset commenced at step 610 may not complete such that the first end user device does not receive the media asset being streamed in its entirety. From the end user's point of view, this may involve the media asset that is streaming ceasing playback before the expected end of the media asset. Stopping the media asset from streaming may involve preventing the first end user device from retrieving future chunks and/or index files (such that future chunks cannot be retrieved). In some embodiments, a message may be transmitted to the client of the first end user device that indicates that playback of the media asset is to be stopped. If the first end user device is prevented from receiving future chunks of the media asset, the second end user device may be permitted to receive chunks of the same or a different media asset from either the computer system or a content delivery network.

Figure 7:
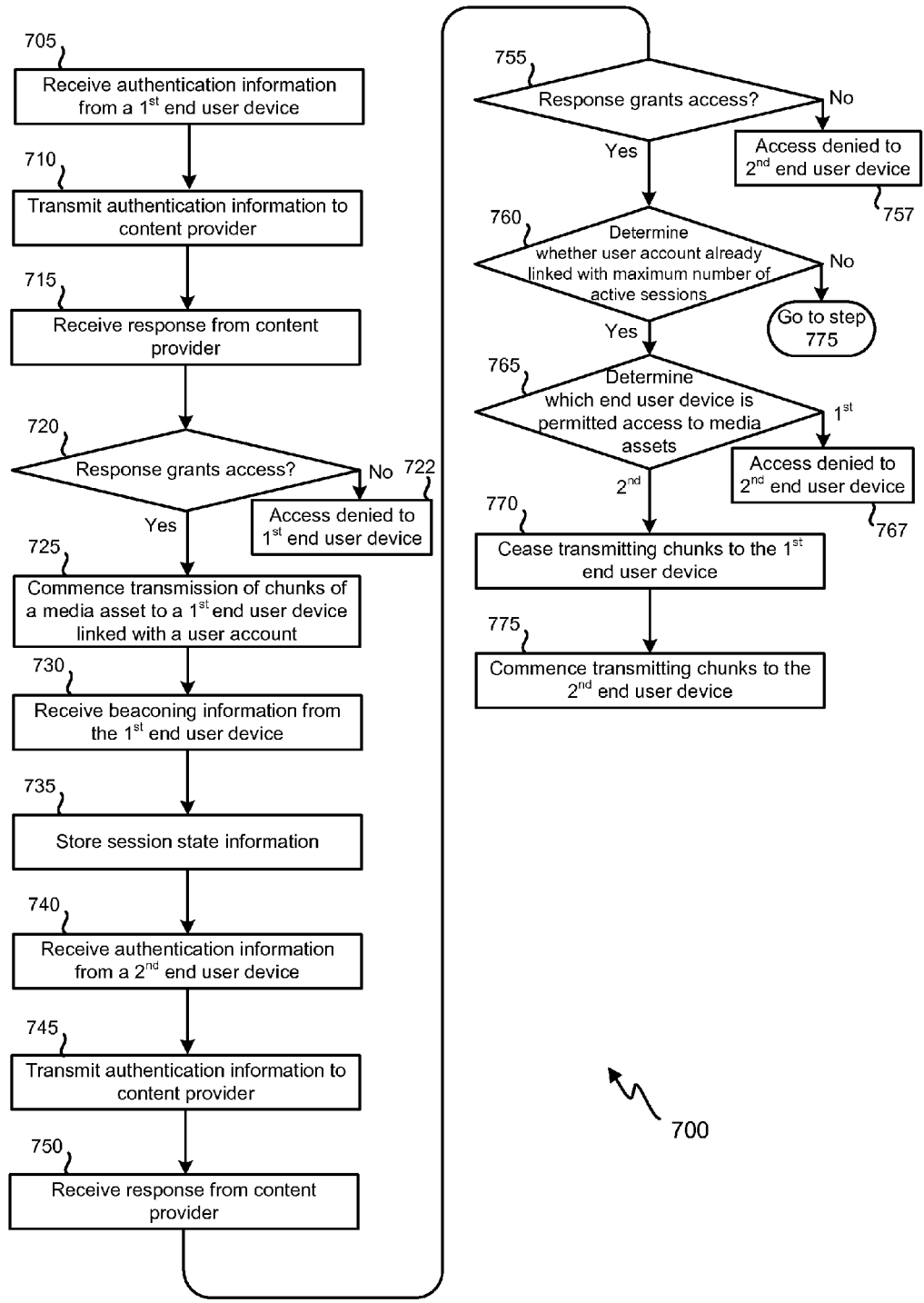
FIG. 7 is another embodiment of a method for controlling access to streaming media.

Method 700 of FIG. 7 is an embodiment of a method for controlling access to streaming media. Method 700 may be performed by the previously detailed systems, such as system 500-1 or system 500-2. Method 700 may also be performed by other systems for controlling access to streaming media. Method 700 may represent the same method as method 600.

At step 705, authentication information may be received by a computer system from a first end user device. Referring to FIG. 5B, stream authenticator 535 may receive authentication information from client 510 of end user device 140. The authentication information may contain information sufficient to identify the first end user device and a user account being used by the (first) end user device. The authentication information may include information such as: a username, user account information, a password, a certificate, a token, an IP address, and/or MAC address. Based on this information, the first end user device may be linked, at least temporarily, with the supplied user account information.

At step 710, some or all of the authentication information received by the computer system may be transmitted to a content provider to be authenticated. Referring to FIG. 5B, stream authenticator 535 (or some other component) of CHIMPS 110 may transmit some or all of the authentication information to content authenticator 525 of content provider 130. If CHIMPS 110 is in communication with multiple content providers, the appropriate content provider may be determined based on the authentication information provided by the first end user device and/or the ownership of a media asset requested by the first end user device. At step 715, a response from the content provider may be received. Referring again to FIG. 5B, a response may be received by stream authenticator 535 from content authenticator 525.

At step 720, the computer system may determine whether the response from the content provider indicates if access to one or more media assets should be granted. Referring to FIG. 5B, stream authenticator 535 (or some other component) of CHIMPS 110 may perform the evaluation. If access is not to be granted, at step 722 access may be denied by the computer system to the first end user device. As such, one or more media assets may not be streamed to the first end user device. If the response indicates that authentication was successful and access is permissible, method 700 may proceed to step 725.

At step 725, chunks of a media asset may commence being transmitted, by the computer system, to a first end user device linked with a user account. Referring to FIG. 5B, chunks may be transferred by media caching server 570 (or some other component of CHIMPS 110) to client 510 of end user device 140. Commencing transmission of chunks to the first end user device may involve transmitting an index file to the first end user device that indicates the location of one or more chunks to be retrieved. Periodically, the first end user device, via a client, may retrieve additional index files from an index file generator. The index files may indicate that the chunks are to be retrieved from the computer system (such as from media caching server 570 in FIG. 5B). In some embodiments, chunks may be retrieved from a content delivery network, such as CDN 150 of FIG. 5A. Chunks may be requested and received at least approximately in sequential order by the first end user device.

At step 730, beaconing information may be received by the computer system from the first end user device. Referring to FIG. 5B, the beaconing information may be received by index file generator 530 (or some other component of CHIMPS 110). As previously detailed, the beaconing information may be derived from requests for chunks and/or index files received by the computer system. For example, as previously noted, if a request is made for a chunk that does not immediately follow a previously-requested chunk, it can be inferred that a skip was made in the playback sequence of the streaming media. If a request is not received within a certain time since a prior request, it can be determined that a stop was made in the streaming media. A stop (or pause) of a certain duration may result in a session being identified as no longer active (e.g., inactive).

At step 735, session information may be stored by the computer system. Referring again to FIG. 5B, stream authenticator 535 (or some other component of CHIMPS 110) may store session information regarding various user accounts and/or end user devices. Such session information may detail which user accounts, users, and/or end user devices have active sessions with the computer system. If an active session becomes inactive, the associated session information may detail when and/or how long ago the session changed to the inactive state. The first end user device and the linked end user account may have session information that states an "active" session is occurring because transmission of chunks of a media asset are ongoing (step 725).

At step 740, authentication information may be received from a second end user device. The authentication information received from the second end user device may indicate the same user account as the authentication information received from the first end user device at step 705. As such, two end user devices are linked with the same user account. As with the authentication information received at step 705, referring to FIG. 5B, stream authenticator 535 (or some other component of CHIMPS 110) may receive authentication information from the second end user device. The authentication information may contain information sufficient to identify the second end user device and the user account. The authentication information may include information such as: the username, user account information, a password, a certificate, a token, an IP address, and/or MAC address. Based on this information, the second end user device may be linked, at least temporarily, with the supplied account information, which, in the example of method 700, is the same as the account information linked with the first end user device. As such, two end user devices are attempting to stream media via the same user account.

At step 745, as with the authentication information for the first end user device, some or all of the authentication information received by the computer system may be transmitted to a content provider to be authenticated. Referring to FIG. 5B, stream authenticator 535 (or some other component) of CHIMPS 110 may transmit some or all of the authentication information to content authenticator 525 of content provider 130. If CHIMPS 110 is in communication with multiple content providers, the appropriate content provider may be selected based on the authentication information provided by the first end user device and/or the ownership of a media asset requested by the first end user device. At step 750, a response from the content provider may be received. Referring again to FIG. 5B, a response may be received by stream authenticator 535 from content authenticator 525. Despite the first end user device previously being authenticated, the content provider may be unaware as to whether the first end user device still has an active session. As such, the second end user device (and associated client) may also be authenticated.

At step 755, the computer system may evaluate whether the response from the content provider indicates if the second user device was authenticated and access to one or more media assets should be granted to the second end user device. Referring to FIG. 5B, stream authenticator 535 (or some other component) of CHIMPS 110 may perform the evaluation. If access is not to be granted (e.g., the authentication information supplied by the second end user device was incorrect), at step 757 access may be denied by the computer system to the second end user device. The first end user device may continue receiving chunks of the media asset without an interruption due to the second end user device. If access is denied to the second end user device, one or more media assets may not be streamed to the second end user device. If the response indicates that access can be granted, method 700 may proceed to step 760.

At step 760, it may be determined by the computer system whether the user account (or user or some other identifier) linked with the second end user device is already linked with a maximum number of active sessions. In some embodiments, the maximum number of active sessions is one. In other embodiments, the maximum number of active sessions may be two, three, four, or more. The maximum number of active sessions may be controlled by a rule set by the content provider or the entity managing the computer system. The number of active sessions may be determined by analyzing the session information stored at step 735. Because the first end user device is receiving chunks (which were commenced at step 725) and because the first end user device and the second end user device are linked with the same user account, the illustrated example of method 700 can be expected to determine that the user account is already linked with one active session. If the number of maximum active sessions has not already been reached, method 700 may proceed to step 765. For the remainder of this example of method 700, it is assumed the maximum number of active sessions is one, such that method 700 proceeds to step 765 because the maximum number of active sessions has already been reached (the first end user device is receiving chunks commenced at step 725).

At step 765, the computer system may determine which end user device is permitted to access media assets (e.g., receive a streaming media asset). Which end user device is given preference may be determined by a rule set by the content provider or by the entity managing the computer system. For example, the rule may state that the initial end user device to be authenticated is given priority. In other embodiments, the most recently authenticated end user device may be given priority. In some embodiments, a default device specified by the end user is given the highest level of priority. Other rules are also possible.

If the first end user device is permitted to (continue) accessing media assets, method 700 may proceed to step 767. At step 767, access is denied to the second end user device. This may involve not providing the second end user device with chunks or an index file. The second end user device may be permitted to play only a preview portion of one or more media assets. The second end user device may receive a message indicating why it was denied access and an identifier of the first end user device (e.g., the message may say "computer at IP address 128.2.27.1 is currently involved in an active session"). This may be useful if the same person is attempting to use his account from two different end user devices and accidentally left media streaming to the first end user device. The user, via the second end user device, may be given the opportunity to end the streaming of media to the first end user device. For example, if the user wishes to stream a media asset while at work, but (possibly inadvertently) left the same or a different media asset streaming at home, the user may be permitted to stop the media asset streaming at home from his end user device at work.

If, returning to step 765, the second end user device is permitted to stream a media asset, then, because in this example only one active session is permitted per user account, the media stream to the first end user device is to be stopped. At step 770, chunks may stop being transmitted to the first end user device. Stopping the transmission of media chunks may be accomplished in several ways. If, in system 500-2, media caching server 570 (or some other component of CHIMPS 110) is providing chunks to the first end user device, the media caching server 570 may be instructed to stop sending chunks to the first end user device. In some embodiments, the first end user device may be permitted to receive the remaining chunks presented in the current index file stored by the first end user device. In such embodiments, the first end user device may not be provided with a subsequent index file by index file generator 530. As such, the first end user device would not be able to receive chunks of the media asset it is streaming subsequent to chunks identified in the first end user device's stored index file. In some embodiments, stream authenticator 535 (or some other component of CHIMPS 110) may send a message to the client of the first end device instructing it to cease playback of the media asset being streamed. If, referring to system 500-1 of FIG. 5A, the first end user device is receiving chunks from content delivery network 150, the first end user device may be permitted to retrieve the remaining chunks indicated in the index file currently stored by the first end user device. Future index files may not be provided to the first end user device, thus preventing future chunks from being retrieved from CDN 150. In embodiments of system 500-1, stream authenticator 535 (or some other component of CHIMPS 110) may send a message to the client of the first end user device instructing it to stop playback of the streaming media asset. However the first end user device is stopped from streaming the media asset, a result may be that at least some remaining chunks, that is, chunks that have not yet been transmitted to the first end user device, are not permitted to be transmitted to the first end user device thereby preventing the first end user device from receiving the entire stream of the media asset.

Approximately following chunks no longer being transmitted to the first end user device (e.g., the first end user device may be permitted to finish receiving the chunks indicated in the current index file possessed by the first end user device), chunks of the same or a different media asset may commence being transmitted to the second end user device at step 775. Reception of chunks by the second end user device may continue unless authentication of some other end user device linked with the same user account is received, at which point method 700 may at least partially repeat.

Figure 8:
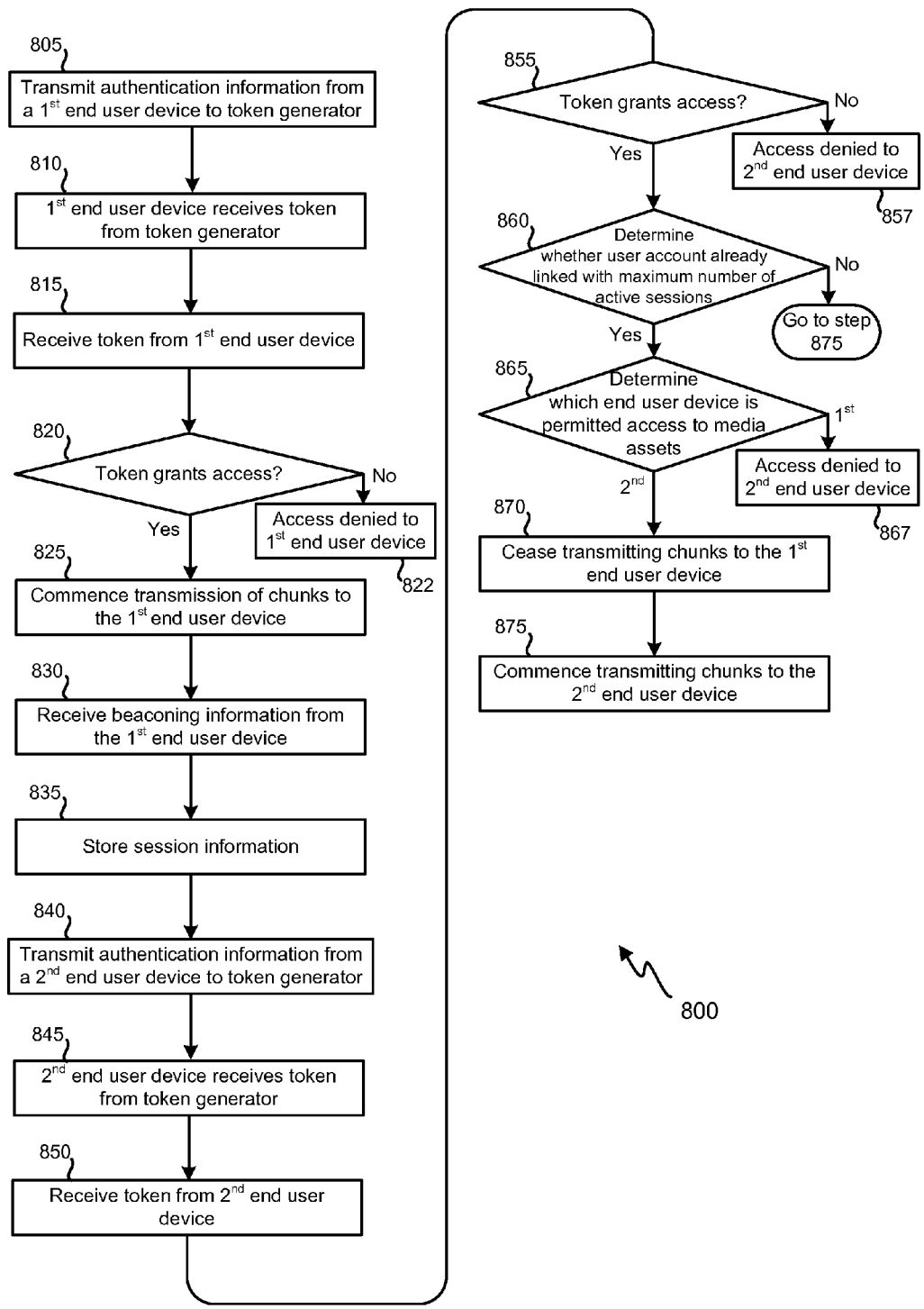
FIG. 8 is yet another embodiment of a method for controlling access to streaming media.

Method 800 of FIG. 8 is an embodiment of a method for controlling access to streaming media. Method 800 may be performed by the previously detailed systems, such as system 500-3. Method 800 may also be performed by other systems for controlling access to streaming media. Method 800 may represent the same method as method 600.

At step 805, authentication information may be transmitted by a first end user device to a token generator. The token generator may handle authentication requests for one or more content providers. Referring to FIG. 5C, client 510 of end user device 140 may transmit authentication information to token generator 585 of authentication provider 580. The authentication information may contain information sufficient to identify the first end user device and a user account being used by the (first) end user device. The authentication information may include information such as: a username, user account information, a password, a certificate, a token, an IP address, and/or MAC address. Based on this information, the first end user device may be linked, at least temporarily, with the supplied user account information.

At step 810, some or all of the authentication information received by the token generator may be transmitted to a content provider to be authenticated. Referring to FIG. 5C, token generator 585 of authentication provider 580 may transmit some or all of the authentication information to content authenticator 525 of content provider 130. A response from the content provider may be received by the token generator. The response may indicate whether or not the end user device should be permitted access to one or more media assets. Referring again to FIG. 5C, a response may be received by token generator 585 from content authenticator 525 of content provider 130. If the response indicates that access should not be granted, a token may not be generated by the token generator. If access is to be granted to one or more media assets as indicated by the response from the content provider, the token generator may generate a token, which may be encrypted, for the first end user device. The token, which may be in the form of a URI or URL, may be used by the first end user device to access one or more media assets. At step 815, the token may be received by the computer system from the first end user device. Referring to FIG. 5C, the token may be received from client 510 of end user device 140 by stream authenticator 535 (or some other component of CHIMPS 110).

At step 820, the computer system may determine whether the token indicates access to one or more media assets should be granted. Referring to FIG. 5C, stream authenticator 535 (or some other component) of CHIMPS 110 may evaluate the token. If access is not to be granted, at step 822 access may be denied by the computer system to the first end user device. As such, one or more media assets may not be streamed to the first end user device. If the token is valid, method 800 may proceed to step 825.

At step 825, chunks of a media asset may commence being transmitted, by the computer system, to the first end user device linked with the user account. Referring to FIG. 5C, chunks may be transferred by media caching server 570 (or some other component of CHIMPS 110) to client 510 of end user device 140. Commencing transmission of chunks to the first end user device may involve transmitting an index file to the first end user device that indicates the location of one or more chunks to be retrieved. Periodically, the first end user device, via a client, may retrieve additional index files from an index file generator. The index files may indicate that the chunks are to be retrieved from the computer system (such as from media caching server 570 in FIG. 5C). In some embodiments, chunks may be retrieved from a content delivery network, such as CDN 150 of FIG. 5A. Chunks may be requested and received at least approximately in sequential order by the first end user device.

At step 830, beaconing information may be received by the computer system from the first end user device. Referring to FIG. 5C, the beaconing information may be received by index file generator 530 (or some other component of CHIMPS 110). As previously detailed, the beaconing information may be derived from requests for chunks and/or index files received by the computer system. For example, as previously noted, if a request is made for a chunk that does not immediately follow a previously-requested chunk, it can be inferred that a skip was made in the playback sequence of the streaming media. If a request is not received within a certain time since a prior request, it can be determined that a stop was made in the streaming media. A stop (or pause) of a certain duration may result in a session being identified as no longer active (e.g., inactive).

At step 835, session information may be stored by the computer system. Referring again to FIG. 5C, stream authenticator 535 (or some other component of CHIMPS 110) may store session information regarding various user accounts and/or end user devices. Such session information may detail which user accounts, users, and/or end user devices have active sessions with the computer system. If an active session becomes inactive, the associated session information may detail when and/or how long ago the session changed to the inactive state. The first end user device and the linked end user account may have session information that states an "active" session is occurring because transmission of chunks of a media asset are ongoing (step 825).

At step 840, authentication information may be transmitted by a second end user device to the token generator (or a different token generator). Again, this token generator may handle authentication requests for one or more content providers. Referring to FIG. 5C, client 510 of end user device 140 may transmit authentication information to token generator 585 of authentication provider 580. This authentication information may contain information sufficient to identify the second end user device and a user account being used by the second end user device. The authentication information may include information such as: a username, user account information, a password, a certificate, a token, an IP address, and/or MAC address. Based on this information, the second end user device may be linked, at least temporarily, with the supplied user account information.

At step 845, some or all of the authentication information received by the token generator may be transmitted to a content provider to be authenticated. Referring to FIG. 5C, token generator 585 of authentication provider 580 may transmit some or all of the authentication information to content authenticator 525 of content provider 130. A response from the content provider may be received by the token generator. The response may indicate whether or not the second end user device should be permitted access to one or more media assets (which may or may not be the same media asset being streamed to the first end user device). Referring again to FIG. 5C, a response may be received by token generator 585 from content authenticator 525 of content provider 130. If the response indicates that access should not be granted, a token may not be generated by the token generator. If access is to be granted to one or more media assets as indicated by the response from the content provider, the token generator may generate a token, which may be encrypted, for the second end user device. The token, which may be in the form of a URI or URL, may be used by the second end user device to access one or more media assets. At step 850, the token may be received by the computer system from the second end user device. Referring to FIG. 5C, the token may be received from the second end user device (not illustrated) by stream authenticator 535 (or some other component of CHIMPS 110).

At step 855, the computer system may determine whether the token indicates if access to one or more media assets should be granted to the second end user device. Referring to FIG. 5C, stream authenticator 535 (or some other component) of CHIMPS 110 may evaluate the token. If access is not to be granted, at step 857 access may be denied by the computer system to the second end user device. As such, one or more media assets may not be streamed to the second end user device. If the token is valid, method 800 may proceed to step 860.

At step 860, it may be determined by the computer system whether the user account (or user or some other identifier, such as the token) linked with the second end user device is already linked with a maximum number of active sessions. In some embodiments, the maximum number of active sessions is one. In other embodiments, the maximum number of active sessions may be two, three, four, or more. The maximum number of active sessions may be controlled by a rule set by the content provider or the entity managing the computer system. The number of active sessions may be determined by analyzing the session information stored at step 835. Because the first end user device is receiving chunks (which were commenced at step 825) and because the first end user device and the second end user device are linked with the same user account, the illustrated example of method 800 can be expected to determine that the user account is already linked with one active session. If the number of maximum active sessions has not already been reached, method 800 may proceed to step 865. For the remainder of this example of method 800, it is assumed the maximum number of active sessions is one, such that method 800 proceeds to step 865 because the maximum number of active sessions has already been reached (the first end user device is receiving chunks commenced at step 825).

At step 865, the computer system may determine which end user device is permitted to access media assets (e.g., receive a streaming media asset). Which end user device is given preference may be determined by a rule set by the content provider or by the entity managing the computer system. For example, the rule may state that the initial end user device to be authenticated is given priority. In other embodiments, the most recently authenticated end user device may be given priority. In some embodiments, a default device specified by the end user is given the highest level of priority. Other rules are also possible.

If the first end user device is permitted to (continue) accessing media assets, method 800 may proceed to step 867. At step 867, access is denied to the second end user device. This may involve not providing the second end user device with chunks or an index file. The second end user device may be permitted to play only a preview portion of one or more media assets. The second end user device may receive a message indicating why it was denied access and/or an identifier of the first end user device. This may be useful if the same person is attempting to use his account from two different end user devices and accidentally left media streaming to the first end user device. The user, via the second end user device, may be given the opportunity to end the streaming of media to the first end user device. For example, if the user wishes to stream a media asset while at work, but (possibly inadvertently) left the same or a different media asset streaming at home, the user may be permitted to stop the media asset streaming at home from his end user device at work.

If, returning to step 865, the second end user device is permitted to stream a media asset, then, because in this example only one active session is permitted per user account, the media stream to the first end user device is to be stopped. At step 870, chunks may stop being transmitted to the first end user device. Stopping the transmission of media chunks may be accomplished in several ways. If, in system 500-3, media caching server 570 (or some other component of CHIMPS 110) is providing chunks to the first end user device, the media caching server 570 may be instructed to stop sending chunks to the first end user device. In some embodiments, the first end user device may be permitted to receive the remaining chunks presented in the current index file stored by the first end user device. In such embodiments, the first end user device may not be provided with a subsequent index file by index file generator 530. As such, the first end user device would not be able to receive chunks of the media asset it is streaming subsequent to chunks identified in the first end user device's stored index file. In some embodiments, stream authenticator 535 (or some other component of CHIMPS 110) may send a message to the client of the first end device instructing it to cease playback of the media asset being streamed. If the first end user device is receiving chunks from content delivery network 150, the first end user device may be permitted to retrieve the remaining chunks indicated in the index file currently stored by the first end user device. Future index files may not be provided to the first end user device, thus preventing future chunks from being retrieved from CDN 150. In some embodiments, stream authenticator 535 (or some other component of CHIMPS 110) may send a message to the client of the first end user device instructing it to stop playback of the streaming media asset. However the first end user device is stopped from streaming the media asset, a result may be that at least some remaining chunks, that is, chunks that have not yet been transmitted to the first end user device, are not permitted to be transmitted to the first end user device thereby preventing the first end user device from receiving the entire stream of the media asset.

Approximately following chunks no longer being transmitted to the first end user device (e.g., the first end user device may be permitted to finish receiving the chunks indicated in the current index file possessed by the first end user device), chunks of the same or a different media asset may commence being transmitted to the second end user device at step 875. Reception of chunks by the second end user device may continue unless authentication of some other end user device linked with the same user account is received, at which point method 800 may at least partially repeat.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of various embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of various embodiments. Rather, the preceding description of the embodiments will provide those skilled in the art with an enabling description for implementing embodiments. Various changes may be made in the function and arrangement of elements without departing from the spirit and scope of the embodiments. While the above description details the streaming of media assets, it should be understood that streaming of other forms of data may be controlled using similar systems and methods.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the embodiments. For example, the above elements may merely be a component of a larger system, wherein other rules may take precedence over or otherwise modify the application of embodiments. Also, a number of steps may be undertaken before, during, or after the above elements are considered. Accordingly, the above description should not be taken as limiting the scope of the embodiments.

What is claimed is:

1. A method for controlling access to media assets during streaming, the method comprising:
commencing transmission of a media asset to a first computerized device, wherein
transmission of the media asset comprises transmission of a plurality of media segments;
receiving, during transmission of the media asset, beaconing data from the first computerized device, wherein
the beaconing data is based on chunk requests, index fix requests, or both, received from the first computerized device;
storing session information linked with the first computerized device, wherein
the session information is at least partially based on the beaconing data received from the first computerized device;
receiving authentication information linked with a second computerized device while transmission of the plurality of media segments to the first computerized device is occurring;
determining the second computerized device is not permitted to receive the media asset based on the session information; and
denying access to the second computerized device based on the session information linked with the first computerized device.

2. The method for controlling access to media assets during streaming of claim 1, wherein
transmission of the media asset to the first computerized device occurs via a content data network.

3. The method for controlling access to media assets during streaming of claim 1, further comprising:
receiving authentication information linked with the first user device that indicates a user account, wherein
the authentication information linked with the second computerized device indicates the user account;
transmitting at least a portion of the authentication information linked with the first computerized device and the user account to a content provider computer system; and
receiving, from the content provider computer system, a response indicating the first user device is authorized to receive the media asset, wherein
the response, indicating the first user device is authorized to receive the media asset, is received prior to commencing transmission of the media asset to the first user device linked with the user account.

4. The method for controlling access to media assets during streaming of claim 3, further comprising:
transmitting at least a portion of the authentication information linked with the second computerized device and the user account to the content provider system; and
receiving from the content provider computer system, a second response indicating the second user device is authorized to receive a second media asset.

5. The method for controlling access to media assets during streaming of claim 1, wherein the media asset is a video provided by a content provider accessible on a subscription basis.

6. A computer program product residing on a non-transitory processor-readable medium for controlling access to media assets during streaming, the computer program product comprising computer-readable instructions configured to cause a computer system to:
commence transmission of a media asset to a first computerized device, wherein
transmission of the media asset comprises transmission of a plurality of media segments;
receive, during transmission of the media asset, beaconing data from the first computerized device, wherein
the beaconing data is based on chunk requests, index fix requests, or both, received from the first computerized device;
store session information linked with the first computerized device, wherein
the session information is at least partially based on the beaconing data received from the first computerized device;
receive authentication information linked with a second computerized device while transmission of the plurality of media segments to the first computerized device is occurring;
determine the second computerized device is not permitted to receive the media asset based on the session information; and
deny access to the second computerized device based on the session information linked with the first computerized device.

7. The computer program product for controlling access to media assets during streaming of claim 6, wherein
transmission of the media asset to the first computerized device occurs via a content data network.

8. The computer program product for controlling access to media assets during streaming of claim 6, wherein the computer-readable instructions further comprise computer-readable instructions configured to cause the computer system to:
receive authentication information linked with the first user device that indicates a user account, wherein
the authentication information linked with the second computerized device indicates the user account;
transmit at least a portion of the authentication information linked with the first computerized device and the user account to a content provider computer system; and
receive, from the content provider computer system, a response indicating the first user device is authorized to receive the media asset, wherein
the response, indicating the first user device is authorized to receive the media asset, is received prior to commencing transmission of the media asset to the first user device linked with the user account.

9. The computer program product for controlling access to media assets during streaming of claim 8, wherein the computer-readable instructions further comprise computer-readable instructions configured to cause the computer system to:
transmit at least a portion of the authentication information linked with the second computerized device and the user account to the content provider system; and
receive from the content provider computer system, a second response indicating the second user device is authorized to receive a second media asset.

10. The computer program product for controlling access to media assets during streaming of claim 6, wherein the media asset is a video provided by a content provider accessible on a subscription basis.

11. A system for controlling access to media assets during streaming, the system comprising:
one or more processors; and
a memory communicatively coupled with and readable by the one or more processors and having stored therein processor-readable instructions which, when executed by the one or more processors, cause the one or more processors to:
commence transmission of a media asset to a first computerized device, wherein
transmission of the media asset comprises transmission of a plurality of media segments;
receive, during transmission of the media asset, beaconing data from the first computerized device, wherein
the beaconing data is based on chunk requests, index fix requests, or both, received from the first computerized device;
store session information linked with the first computerized device, wherein
the session information is at least partially based on the beaconing data received from the first computerized device;
receive authentication information linked with a second computerized device while transmission of the plurality of media segments to the first computerized device is occurring;
determine the second computerized device is not permitted to receive the media asset based on the session information; and
deny access to the second computerized device based on the session information linked with the first computerized device.

12. The system for controlling access to media assets during streaming of claim 11, wherein the processor-readable instructions which, when executed by the one or more processors, cause the one or more processors to:
receive authentication information linked with the first user device that indicates a user account, wherein
the authentication information linked with the second computerized device indicates the user account;
cause at least a portion of the authentication information linked with the first computerized device and the user account to be transmitted to a content provider computer system; and
receive, from the content provider computer system, a response indicating the first user device is authorized to receive the media asset, wherein
the response, indicating the first user device is authorized to receive the media asset, is received prior to commencing transmission of the media asset to the first user device linked with the user account.

13. The system for controlling access to media assets during streaming of claim 12, wherein the processor-readable instructions which, when executed by the one or more processors, cause the one or more processors to:
cause at least a portion of the authentication information linked with the second computerized device and the user account to be transmitted to the content provider system; and
receive from the content provider computer system, a second response indicating the second user device is authorized to receive a second media asset.

14. The system for controlling access to media assets during streaming of claim 11, wherein the one or more processors are distributed.

* * * * *